United States Patent
Naville et al.

(10) Patent No.: US 8,898,020 B2
(45) Date of Patent: Nov. 25, 2014

(54) METHOD FOR TIME PICKING AND ORIENTATION OF THREE-COMPONENT SEISMIC SIGNALS IN WELLS

(75) Inventors: Charles Naville, Satrouville (FR); Sylvain Serbutoviez, Paris (FR); Jean-Claude Lecomte, Rueil-Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 562 days.

(21) Appl. No.: 13/201,010
(22) PCT Filed: Feb. 10, 2010
(86) PCT No.: PCT/FR2010/000100
§ 371 (c)(1),
(2), (4) Date: Oct. 4, 2011
(87) PCT Pub. No.: WO2010/092249
PCT Pub. Date: Aug. 19, 2010

(65) Prior Publication Data
US 2012/0046871 A1 Feb. 23, 2012

(30) Foreign Application Priority Data
Feb. 12, 2009 (FR) ...................................... 09 00643

(51) Int. Cl.
*G01V 1/28* (2006.01)
*G01V 1/30* (2006.01)
(Continued)

(52) U.S. Cl.
CPC ........................................ *G01V 1/42* (2013.01)
USPC ..................... 702/17; 702/14; 367/25; 367/63

(58) Field of Classification Search
CPC ....... G01V 1/42; G01V 1/3835; G01V 1/008; G01V 1/28; G01V 1/284; G01V 1/286; G01V 2210/123; G01V 2210/161; G01V 1/02; G01V 1/288; G01V 1/34; G01V 1/364; G01V 1/368; G01V 1/50; G01V 2210/56; G01V 99/00; E21B 17/028; E21B 17/042; E21B 47/01; G06F 19/00
USPC ................ 702/14, 17, 18; 367/38, 43, 47, 48, 367/50–52, 57–59, 63, 25
See application file for complete search history.

(56) References Cited

U.S. PATENT DOCUMENTS 3,221,297 A * 11/1965 Smith et al. ...................... 367/41
4,516,206 A * 5/1985 McEvilly .......................... 702/18
(Continued)

FOREIGN PATENT DOCUMENTS

| CA | 1106957 | 9/1977 |
| GB | 1 59 581 | 9/1977 |

(Continued)

OTHER PUBLICATIONS

Disiena, J.P., et al: "Three-Component Vertical Seismic Profiles: Orientation of Horizontal Components for Shear Wave Analysis", International Exposition and Annual Meeting of Society of Exploration Geophysicists, XX, XX, Jan. 1, 1981, pp. 1991-2011, XP008080502.
(Continued)

*Primary Examiner* — Michael Nghiem
*Assistant Examiner* — Alexander Satanovsky
(74) *Attorney, Agent, or Firm* — Antonelli, Terry, Stout & Krauss, LLP.

(57) ABSTRACT

A method, having application to petroleum exploration or production, for picking the arrival time of seismic waves and use thereof for orienting the components of a multi-component sensor. After acquisition of seismic data using a VSP type method, with a multi-component sensor, a module signal is constructed by calculating the square root of the sum of the squares of at least two orthogonal seismic components. Arrival times of a direct seismic wave are then picked on an amplitude extremum of this module signal. Based on this picking, the seismic components can then be oriented in a unique reference frame whatever the depth of the sensor. A time window is defined on either side of the picked arrival times and the azimuthal direction is determined by maximizing the energy of the horizontal components within this time window. Finally, the three components are oriented in a reference frame defined with respect to the azimuthal direction, which is identical for each depth.

45 Claims, 11 Drawing Sheets

(51) Int. Cl.
*G01V 1/00* (2006.01)
*G01V 1/48* (2006.01)
*G01V 1/42* (2006.01)

(56) References Cited

U.S. PATENT DOCUMENTS

| | | | |
|---|---|---|---|
| 4,706,224 A * | 11/1987 | Alford | 367/41 |
| 4,783,770 A | 11/1988 | Danbom | |
| 5,060,203 A | 10/1991 | Winterstein | |
| 5,747,750 A * | 5/1998 | Bailey et al. | 181/112 |
| 6,028,821 A * | 2/2000 | Boelle | 367/40 |
| 6,076,045 A * | 6/2000 | Naville | 702/10 |
| 6,868,038 B2 * | 3/2005 | Leaney | 367/57 |
| 6,922,373 B2 | 7/2005 | Armstrong | |
| 2003/0086335 A1 * | 5/2003 | Naville et al. | 367/58 |
| 2004/0052159 A1 | 3/2004 | Armstrong | |
| 2004/0158997 A1 * | 8/2004 | Tang | 33/304 |

FOREIGN PATENT DOCUMENTS

| | | |
|---|---|---|
| GB | 1 569 581 A | 6/1980 |
| WO | WO 01/88570 A1 | 11/2001 |

OTHER PUBLICATIONS

Dai, Hengchang, et al: "Effects of Learning Parameters on Learning Procedure and Performance of a BPNN", Neural Networks, Elsevier Science Publishers, Barking, GB, vol. 10, No. 8, Nov. 1, 1997, pp. 1505-1521, XP027378818, ISSN: 0893-6080.

Morozov, Igor B., et al: "Transformation of Four-Component Vertica Seismic Profiling Records from Kola Superdeep Borehole, Russia", Computers and Geosciences, Pergamon Press, Ocford, GB, vol. 23, No. 10, Jan. 1, 1998, pp. 1039-1049, XP007908670, ISSN: 0098-3004.

Knecht, M. et al: "Processing Shear-Wave VSP Data", Geophysical Prospecting, vol. 35, No. 9, Nov. 1, 1987, pp. 955-972, XP55003659, ISSN: 0016-8025, DOI: 10.1111/j. 1365-2478.1987.tb00854.x.

Bush, Ian, et al: "Paris Basin VSPs : Case History Establishing Combinations of Fine Layer (or Lithologic) Anisotropy and Crack Anisotropy from Modelling Shear Wavefields Near Point Singularities," Geophys. Journal Int., 1991, No. 107, pp. 433-437.

Becquey, M. et al: "Three-Component Sonde Orientation in a Deviated Well", Geophisics, vol. 55, No. 10 (Oct. 1990); p. 1386-1388.

Neville, Charles: "Detection of Anisotropy Using Shear-Wave Splitting in VSP Surveys : Requirements and Applications", SEG Expanded Abstracts, 56$^{th}$ Int. SEG Meeting, 1986, Houston, S5.2, pp. 391-394.

Greenlagh et al: "Orientation of a Downhole Triaxial Geophone", Geophysics, vol. 60, No. 4, pp. 1234-1237.

X. Zeng et al: "Two Methods for Determining Geophone Orientations from VSP Data", Geophysics, vol. 71, No. 4, pp. V87-V97, 2006.

Ch. Cliet: "Anisotropy Survey for Reservoir Definition", Geophys. J. Internat., 1991, 107, pp. 417-427.

C. Esmersoy: "Velocity Estimation from Offset VSPs Using Direct P and Converted SV-Waves", POS6.4, SEG Abstracts 1987, pp. 538-541.

L. Nicoletis et al: "Shear-Wave Splitting Measurements from Multishot VSP Data", Expanded Abstracts, 58$^{th}$ Int. SEG Meeting, 1988, Anaheim, POS 6.1, pp. 527-530.

J.P. DiSiena, et al: "Horizontal Components and Shear Wave Analysis of Three-Component VSP Data", Chapter 4—Analyzing Three-Component VST Data, in M.N. Toksöz and R. R. Stewart, eds., Vertical Seismic Profiling, Part B: Advanced/Concepts: Geophyiscal Press, pp. 177-235.

A. Benhama et al: 1988 "Study and Application of Spatial Directional Filtering in Three Component Recordings: Geophysical Prospecting", 36, pp. 591-613.

* cited by examiner

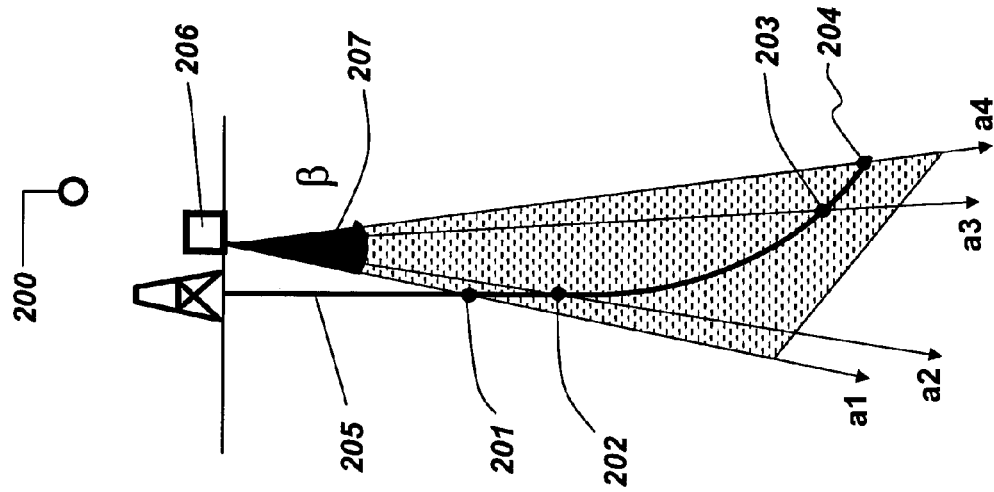
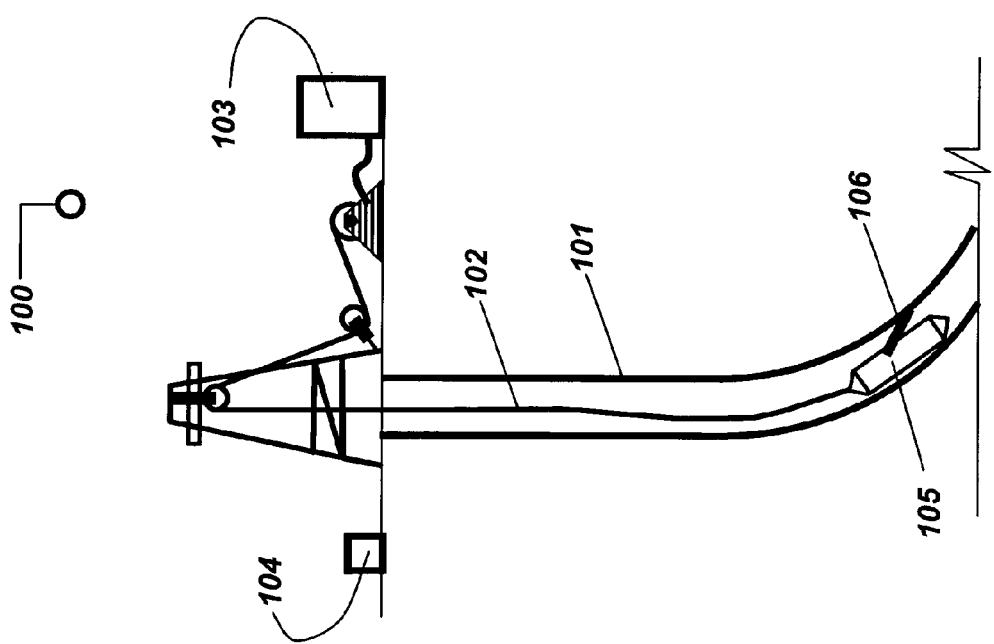
Fig. 2a
Fig. 1

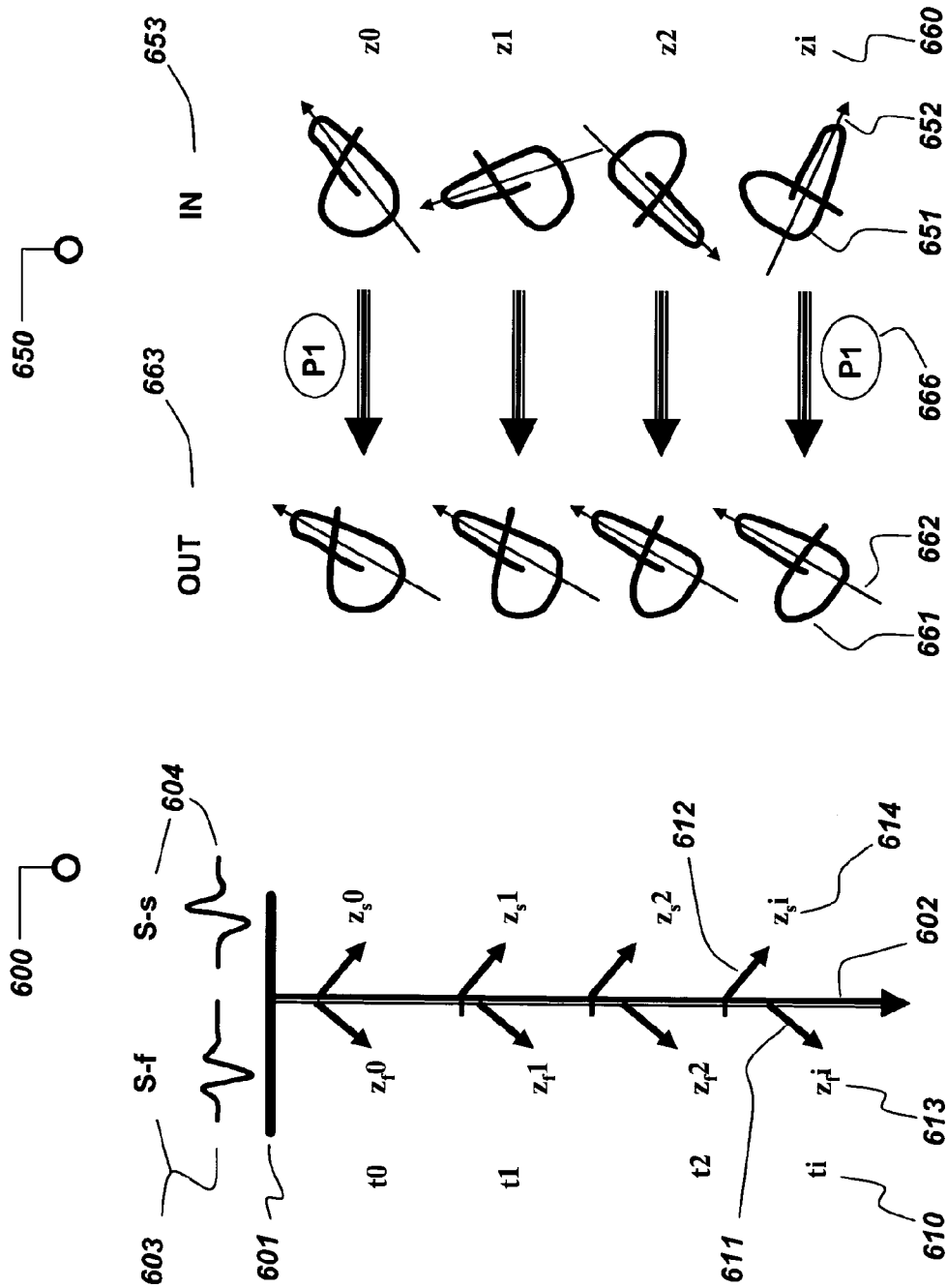

METHOD FOR TIME PICKING AND ORIENTATION OF THREE-COMPONENT SEISMIC SIGNALS IN WELLS

BACKGROUND OF THE INVENTION

Field of the Invention

The present invention relates to well surveying and more particularly to pre-processing techniques for seismic data acquired by multi-component sensors and obtained during Vertical Seismic Profiling (VSP) operations.

The VSP technique is commonly used for better knowledge of the structure of the reservoir and of its vicinity during exploration or development phases. This technique is also used to define the geological structures near to wells for drilling guidance or to redefine a deviation of the wellbore trajectory if the objective has unfortunately not been reached.

The most conventional implementation of vertical seismic profiling (VSP) is achieved by a seismic emission performed by a surface repetitive source and reception in the well. The latter is achieved by a particular well probe that is successively stationed at different depths. The probe comprises a sensor, generally a three-component sensor, an anchoring system and a digitization unit for most of the modern tools. The anchoring system and the mechanical design of the well reception probe are such that the three-component record of the three-dimensional displacement of the formation upon passage of the various seismic waves is an accurate reproduction of the effective displacement of the formation. The notion of vector fidelity characterizes the isotropy of the mechanical anchoring of the receiving probe sensors on the well wall, and the desired three-component seismic reception isotropy. Acquisition can be carried out with a triaxial sensor located at one depth, or by an antenna of triaxial sensors located at adjacent reception depth levels.

FIG. 1 diagrammatically shows in a general manner the acquisition geometry of a VSP 100 conducted in a well 101 drilled substantially vertical and generally weakly deviated over some depth intervals. The well depth can typically reach several thousand meters. The seismic well probe 105 containing the triaxial seismic sensors is lowered by a cable 102 that connects it to a surface recording unit 103 from which the field engineer controls the well probe, remote controls seismic source 104 and controls the measurement quality. In order to measure with a good vector fidelity, the seismic signal that propagates in the rock formation, coming from surface seismic source 104, the probe is tightly pressed against the well wall by an anchoring device symbolized by arm 106, prior to recording by each measurement depth station. In the common configuration of the base VSP, the surface seismic source 104 referred to as "zero-offset" source is arranged in practice within a 100-m radius with respect to the wellhead. Considering the well depth, seismic source 104 is referred to as "surface" source even if it is located at a depth of some meters. Seismic probe 105 diagrammatically shown in FIG. 1 can in reality represent a reception probe comprising several adjacent seismic reception depth levels, typically 15 to 20 meters away from each other with each level corresponding to an independent seismic probe comprising triaxial seismic sensors and an anchoring system.

FIG. 2 diagrammatically shows the geometry of propagation 200 of the direct seismic waves emitted by surface source 206, received by sensors 201 to 204 arranged in well 205: the narrowness of the solid angle 207 (β) of propagation with direct arrival can be observed in this figure. This angle encompasses all of the deep part of the well where the VSP measurements are performed with a fine regular interval, commonly of 15 m. In fact, the narrowness of the solid angle of emission guarantees, for the reception in the well, the waveform constancy hypothesis of the seismic propagation eigenmodes in stratified media substantially homogeneous for adjacent depth measurement levels. Furthermore, it can be seen in the diagram of FIG. 2a that the propagation direction difference is extremely reduced between the direct rays associated with adjacent well measurement levels, such as for example direct rays a1 and a2 associated with pair of positions 201-202, or direct rays a3 and a4 associated with pair 203-204. In practice, the close proximity of the propagation paths between a common source and substantially adjacent receivers, ten to a hundred meters away from each other for example, is also verified for a descending wave, more complex than a direct wave which for example may be an S-converted P type wave vertical to an interface located at an intermediate depth, for example in the upper half of the total depth of the well.

FIGS. 2b and 2c illustrate two propagation geometries for which the direct arrival of the pressure wave P is orthogonal to the direction of the Z-component of known spatial direction. Consequently, all the P-wave energy is recorded by sensors X and Y of known spatial direction, and it is therefore not easy to pick a remarkable phase of the direct wave on the raw signals in a coherent manner on the adjacent depth measurement levels.

FIG. 2b diagrammatically shows the propagation geometry 210 of the direct seismic waves 212 emitted by surface source 216, received by sensor 211 arranged in well 215, and arriving perpendicular to well 215. The trajectory of this well is substantially horizontal at the level of the position of sensor 211 whose Z-component 213 is axial to the well.

FIG. 2c diagrammatically shows the propagation geometry 220 of the direct seismic waves 222 emitted by surface source 226, received by sensor 221 arranged in well 225, and arriving perpendicular to the substantially vertical Z-component 223 of three-component sensor 221. The trajectory of this well 225 is substantially vertical at the level of the position of sensor 221.

The term "multi-component" qualifies a particular arrangement of a plurality of seismic sensors. For example, a three-component sensor comprises three unidirectional seismic receivers arranged along orthogonal axes, such as geophones or accelerometers. The seismic waves propagate in three dimensions with a three-component sensor being used to characterize all the seismic waves.

What is referred to as "component" is the signal coming from a unit seismic sensor. A three-component sensor generates three electric signals recorded along three orthogonal axes. In general, the well reception probe comprises a component of known axis, arranged either along the vertical or along the axis of the tool. This axis of the tool substantially coincides with the axis of the well, after anchoring the probe onto the well wall, and of two orthogonal components whose exact direction in the orthogonal plane is not known.

It is commonplace, during exploitation of the seismic data obtained by a VSP type method using three-component sensors, to process only one of the components recorded which are generally either the vertical component or the component axial to the well, or the component corresponding to the spatial direction maximizing the pressure wave direct arrival energy. Examples of single-component processing of seismic data are described in many publications and books, for example in the following specialized books:

Hardage, B.; "Vertical Seismic Profiling": Principles, Third updated and revised edition; in: Handbook of Geophysical Exploration, seismic exploration, Vol. 14, 2000, Pergamon, Elsevier Science;

A. H. Balch & Myung W. Lee; Vertical Seismic Profiling: technique, Applications, and case Histories, 1984, D. Reidel publishing Company;

Mari, J. L. et al; "Seismic Well Surveying", 1991, Editions Technip, Paris.

It is also usual to account for the polarization of the direct waves in pressure mode for the orientation and processing of vertical seismic profiles with offset, for which the well is substantially vertical and the position of the source is at a distance greater than 10% of the total depth of the well. The orthogonal component that maximizes the pressure wave (P-wave) direct arrival energy is calculated in the orthogonal plane, and in a time window defined by the time pick of this direct P arrival. This azimuthal direction is determined in a plane, from two components, using an energy maximization technique which for example is described in the following document:

DiSiena, J. P., J. E. Gaiser, and D. Corrigan, 1984, "Horizontal Components and Shear Wave Analysis of Three-Component PSV Data", in M. N. Toksöz and R. R. Stewart, eds., Vertical Seismic Profiling, Part B: Advanced Concepts: Geophysical Press, 177-235.

However, the conventional limitation of the processing to only one or two of the components leads to potential indeterminations in the identification of the wave mode of some arrivals received by the sensor, pressure or shear on one hand, and in the positioning of geological events on the other hand, which cannot be removed. Times inversion or the techniques of migrating only reflected seismic events, leads to a plurality of solutions since the azimuthal direction of dip of the reflectors remains unknown. Furthermore, when two seismic events arrive at the same time with close apparent velocities, and appear on some adjacent depth traces (six to twelve for example), it is verified that it is nearly impossible to separate them using a conventional single-component processing.

It is therefore essential, in order to improve the reliability of the VSP data interpretation, to process the three components. However, the acquisition stage does not allow giving the real orientation of the geophones of the cable, whereas this information is essential for these data to be processed. In fact, the horizontal components obtained from three-component VSP have an unknown and random orientation because the cables carrying the seismic sensors (geophones) cannot control the orientation of these elements. Processing the three components can be considered, insofar as the mechanical reception isotropy quality of the VSP probe (referred to in short as reception "vector fidelity") is sufficiently good. This is the case with most modern VSP tools wherein the ratio of the anchoring force of the part of the probe (or of the entire probe) supporting the triaxial sensors to the weight in air of the support (or of the probe) is greater than five. However, although there are accessories for complete orientation measurement of a tool in a well, such as magnetometers-inclinometers and well gyroscopes, these sophisticated equipments are often unused because they involve a substantial additional cost. Furthermore, they may deteriorate the mechanical anchoring qualities of the VSP probe combined therewith. It has been observed that the VSP acquisition stage only rarely allows systematic providing of the real and complete orientation of the three-component sensors, whereas this information is essential for processing the three components. In fact, the orthogonal components obtained from three-component VSP most often have an unknown and random orientation. This is in particular the case in weakly inclined well depth intervals, notably below 10° vertical inclination, intervals within which the partial orientation devices, such as cardan mounting of the sensors or addition of a gravity-sensitive pendular device measuring the relative bearing angle in the plane orthogonal to the axis of the tool, are made inoperative.

Thus, in order to process in a complete, efficient and beneficial manner all the signals obtained from multi-component sensors, which make up a usual seismic well data set, it is necessary to orient the geophones of the multi-component sensors.

In order to determine an azimuthal direction in space from the three components, the covariance matrix analysis technique described in the following documents can be used:

Benhama, A., Cliet, C., and Dubesset, M., 1988, Study and Application of Spatial Directional Filtering in Three Component Recordings: Geophysical Propecting, 36, 591-613, Cliet, C., and Dubesset, M., 1987: La paramétrisation des trajectoires de particules, Institut Français du pétrole, Report No 35080.

This technique assumes that the calculated polarization direction thus belongs to the vertical plane containing the source and receiver positions. This is realistic in a stratified sedimentary medium, even with low to medium dip values (up to about 20° and for any dip if the source and the well sensor are located in the local structural dip plane near the well). This process involves picking the direct pressure wave on the component vertical or axial to the well, whose signal form is coherent on the adjacent depth traces. This process becomes inapplicable if the direct pressure arrival energy is too low on the orthogonal components.

This method of estimating the orientation of three-component sensors by direct P-wave signal energy maximization in a time window defined by vertical or axial component picking applies well to acquisition geometries such as offset VSP, which comprises at least one surface seismic source fixedly positioned at a given offset distance from the well (typically equal to 0.2 to 1.5 times the total vertical depth of the well). The three-component sensors of the 2D or 3D walkaway and walkaround configurations, which record on an antenna of 3C fixed sensors in the well the signal emitted from a plurality of surface source positions according to a layout that determines the well seismic survey type, are oriented similarly. Thus, a 2D walkaway corresponds to a line of source points, a 3D walkaway corresponds to a more or less regular grid of source points and a walkaround corresponds to a circle of source shot points around the well.

For example, a method of orienting orthogonal sensors by means of direct P-wave arrival polarization is well illustrated in the configuration of a plurality of source points located at various azimuths around the well in the following document:

P. N. Armstrong, "Method of Estimating Relative Bearing of a Borehole Receiver", Jul. 26, 2005, U.S. Pat. No. 6,922,373 B2.

In all these cases, the plurality of surface source positions allows finding several positions for which the process using direct P-wave arrival maximization is suited for accurate and redundant orientation estimation. The downhole tool does not need to be fitted with a component orientation device.

With the redundancy of source points, the adoption of a common propagation hypotheses in the source-receiver vertical plane, and insofar as the rectilinearity of the direct P-wave arrival is correct for a sufficient proportion of source points, it is not even necessary to know the well trajectory, as shown in the following document:

Stewart A. Greenlagh and Ian M. Mason, "Orientation of a Downhole Triaxial Geophone", 1995, Geophysics, VOL. 60, NO 4, p 1234-1237.

Finally, there are also two known methods allowing determination of the orientation of the two horizontal components when there is a plurality of source positions at the surface, described in:

X. Zeng, G. A., McMechan, "Two Methods for Determining Geophone Orientation From PSV Data", Geophysics, Vol. 71, No. 4, p. V87-V97, 2006.

A first method, based on the polarization plane, allows determination of the orientation of the horizontal components of sensors mounted on cardans, from the polarization energy of a time window around the direct P arrival, with an indetermination of $\pi$ on the angle found. It is a notable fact in this document that this indetermination of $\pi$ is maintained whereas it could be readily removed by picking a remarkable phase of the P arrival signal on the vertical component, which is in particular an amplitude extremum, and by imposing a systematically identical polarity on the horizontal component from the amplitude maximization process, as it is done industrially. Naturally, this conventional polarization method referred to as PPDI gives satisfactory results only if the P-wave energy is substantial in the horizontal plane, and this method uses the massive plurality of surface source points to improve the orientation reliability and to remove the aforementioned indetermination of $\pi$.

It is also possible to use the polarization properties of the direct seismic P-waves for re-orienting the components located in a plane perpendicular to the well axis, in the case of a particular geometry: acquisition geometry in a deviated well of known trajectory, with a single surface seismic source offset with respect to the wellhead, and with recording by triaxial sensors that are fixed with respect to the body of a tool that is not fitted with relative bearing angle measuring accessories. One then applies a procedure for maximizing the P arrival on the orthogonal components. One also assumes that the direct P-wave ray is contained in the vertical plane comprising the surface source and the downhole sensor. Naturally, this re-orientation is valid only for the logging in progress, and it is easy when the direct P arrival is of substantially linear polarization, descending or ascending refracted, and non interfered. This technique, known to the person skilled in the art, is for example described in the following document:

M. Becquey et M. Dubesset., "Three Component Sonde Orientation in a Deviated Well" Geophysics, 1990, vol. 55 No 10, p. 1386-1388.

This orientation method generally provides either two solutions or a double solution, or no solution. If need be, the indetermination of the double solution of the direct P-wave arrival ray is removed while keeping only the one that is the closest to the line defined by the source and the receiver. If there is no solution, the double solution is kept as an approximation: ($\Phi=\Phi_0$ in Equation 6, page 1387 of the aforementioned document). This re-orientation technique has been successfully used on several real cases, as shown for example by the illustrations page 420 of the following document:

C. Cliet, L. Brodov, A. Tikhonov, D. Marin and D. Michon, "Anisotropy Survey for Reservoir Definition", Geophys. J. Internat., 1991, 107, 417-427.

A limitation to all the aforementioned orientation processes taking into account the direct P-wave arrival occurs when the energy of the direct arrival projection on the two non-axial, or non-vertical, components is very low. This is for example the case if the well is vertical or weakly deviated, notably with the very common acquisition geometry referred to as zero-offset VSP, for which the surface source located near to the wellhead is activated in a single position, onshore or offshore, with a geological structure having any local and often unknown dips. It is well known to overcome this limitation by activating a seismic source additional to the zero-offset source, located at a sufficient distance from the well, preferably in the general azimuthal direction of the geological structure around the well. This alternative option is however rarely used because it involves extra costs for the measuring operation, as well as a longer acquisition time, and therefore immobilization of the drill rig on the site. Activation of this additional source is performed successively or simultaneously with the zero-offset source, with the same anchoring and measuring depth position as the VSP tool, whose three components are to be oriented. Furthermore, these palliatives to prior shooting methods or geometrical configurations have the drawback of not being always applicable, either because of uneven reliefs for example, or because of the material or financial unavailability of additional seismic sources, or because of interference of the direct P-wave arrival by a secondary refracted or diffracted arrival. When it is absolutely necessary to know the orientation of the triaxial sensors, it is judicious to consider using an additional offset source and to compare this solution with the alternative choice of a well tool that can be combined with an orientation accessory. In practice however, these two VSP measuring modes are rarely implemented.

Besides, after orientation of the triaxial components, some multi-component VSP processing programs are limited to the two components contained in the vertical plane comprising the sensor and the source, such as, for example, the method described in the following document:

C. Esmersoy, "Velocity Estimation from Offset VSPs Using Direct P and Converted SV-waves", POS6.4, SEG abstracts 1987, p 538-541.

However, as explained above, the conventional limitation to one or two of the components leads to potential indeterminations in the identification of the wave mode of some arrivals received by the sensor, pressure or shear on the one hand, and in the positioning of geological events on the other hand, which cannot be removed.

Thus, in order to process in a complete, efficient and beneficial manner all the signals obtained from multi-component sensors, which make up a usual seismic well data set, it is necessary to orient the geophones of the multi-component sensors.

SUMMARY OF THE INVENTION

The invention is an alternative method for spatial orientation of the geophones of a multi-component sensor allowing overcoming the orientation difficulties of prior techniques. The method provides orientation of the geophones in a locally coherent and substantially unique reference frame for all the measurement levels, which are unknown to within a constant rotation, and to orient the three components in a frame of geographic directions related to the globe, in order to allow isotropic processing of the three components for the benefit of the structural and geological interpretation. The method is based on an original technique of time picking the arrival times of a direct (P or S) wave on one of the most energetic phases of a module signal.

The present invention relates to a method of estimating the orientation of a multi-component seismic sensor.

The invention thus relates to a method of pre-processing seismic data acquired by a seismic prospecting method of the vertical seismic profiling (VSP) type. The seismic prospecting method for vertical seismic profiling of the invention comprises emitting seismic waves and receiving these seismic waves by at least one multi-component sensor positioned in a well at least at two depths. Each sensor comprises at least three orthogonal geophones recording as a function of time a first seismic component in a known vector direction, and at least two other seismic components in two directions orthogonal to this known vector direction. The method comprises the following stages:

a—constructing a new signal by calculating the square root of the sum of the squares of at least two orthogonal seismic components, referred to a "module signal," and picking arrival times of a direct seismic wave on an amplitude extremum of the module signal;

b—orienting the seismic components in a unique reference frame, whatever the depth of the sensor, by the following stages, repeated for each depth:

defining a time window on either side of the arrival times;
determining an azimuthal direction by maximizing an energy of the seismic components orthogonal to the known vector direction within the time window; and
orienting to within 360° the seismic components orthogonal to the known vector direction in a unique reference frame defined with respect to the azimuthal direction that is identical for each depth.

According to an embodiment, the module signal can be constructed by calculating the square root of the sum of the squares of the two seismic components orthogonal to the known vector direction. The arrival times of a descending shear wave are then picked.

According to another embodiment, the arrival of a pressure wave can also be picked. The velocities of the shear and pressure waves can then be calculated from these arrival times. Velocity ratios and/or a Poisson coefficient can be deduced therefrom.

According to another embodiment, the module signal can be constructed by calculating the square root of the sum of the squares of the three seismic components, and the arrival times of a direct pressure wave are picked.

Preferably, prior to a), the isotropy of the signal in three components is preserved by respecting amplitude ratios and phase differences between the seismic components.

According to the invention, a signal-to-noise ratio of the three components of the raw signal can be improved, prior to calculating the module, by an isotropic deconvolution of the three components by a unique descending pressure wave signal extracted from the seismic component of known vector direction. It is also possible to filter the module signal so as to remove low-frequency components prior to picking the arrival times of the direct seismic wave.

According to an embodiment, the geographic orientation of this unique reference frame can be determined.

The geographic orientation of the unique reference frame can be determined by mounting the multi-component sensor on a double cardan system which allows orientation by gravity the seismic components when the well inclination reaches a value of at least approximately 10°.

It is also possible to lower into the well a measuring tool comprising the fixedly mounted multi-component sensor. The geographic orientation of the unique reference frame is then determined by means of a relative bearing angle measuring system mounted on the measuring tool, which allows to find the orientation of the multi-component sensor when the well inclination reaches a value of at least approximately 10°.

According to an embodiment, a measuring tool comprising a plurality of multi-component sensors located at adjacent measurement depths is lowered into the well and the geographic orientation of the unique reference frame is determined by coupling at least one of the multi-component sensors with a geographic orientation measurement tool such as a magnetometer-inclinometer or a gyroscope.

According to another embodiment, at least a portion of the well is horizontal and the multi-component sensor is fixedly mounted in a downhole measuring tool. The geographic orientation of the unique frame is then determined by likening a direct pressure wave maximization direction to a straight line connecting a position of the sensor to a position of a source emitting the seismic waves.

According to the invention, it is also possible to determine, on various well portions, unique frames having a common axis, which have overlap zones allowing determination of an angle of rotation to be applied to these unique frames, so as to obtain a unique frame for the entire well.

Finally, orientation in a unique frame can be used in an automated manner to obtain control of the seismic components quality, immediately after acquisition of the measurements in the field.

BRIEF DESCRIPTION OF THE DRAWINGS

Other features and advantages of the method according to the invention will be clear from reading the description hereafter of embodiments given by way of non imitative examples, with reference to the accompanying figures wherein:

FIG. 1 diagrammatically shows in a general manner the geometry of acquisition of a VSP with surface source and probe comprising a single seismic reception level, lowered into a substantially vertical well by means of a cable;

FIG. 2a illustrates the narrowness of the solid angle of propagation with direct arrival, which guarantees the wave form constancy hypothesis of the seismic propagation eigenmodes in stratified media, substantially homogeneous for adjacent depth measurement levelsp

FIGS. 6a, 6b, 6c and 6d illustrate the propagation principle of the seismic shear wave (S-wave) eigenmodes in a substantially homogeneous medium, and the method of orienting the two non-oriented orthogonal components in a unique intermediate frame according to the invention;

DETAILED DESCRIPTION OF THE INVENTION

Figure 2C:
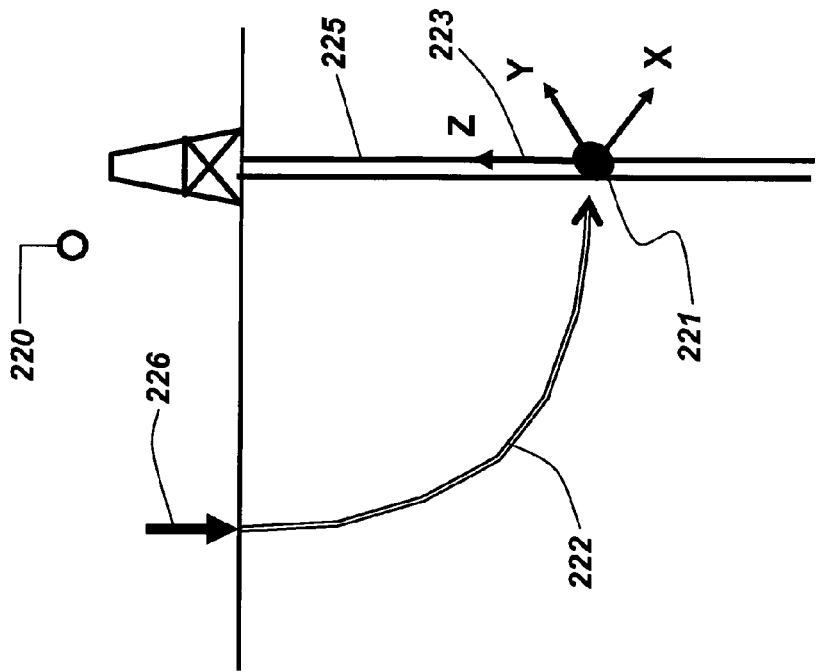
FIGS. 2b and 2c illustrate two propagation geometries for which the direct P pressure arrival is orthogonal to the direction of the Z component of known spatial direction wherein this situation can occur in horizontal wells (FIG. 2b), in deviated wells or in vertical wells (FIG. 2c), when the source is a suitable distance away from the well.

The invention relates to a method for pre-processing of seismic data acquired while carrying out a seismic prospecting operation of the vertical seismic profiling type. According to an embodiment, this operation comprises a single surface position for the emission of seismic waves, in the vicinity of the drilling rig, and reception of the seismic waves by a multi-component sensor positioned in a vertical to weakly deviated well. The sensor (mounted in the seismic probe) comprises three orthogonal geophones. The sensor is stationed at least at two depths which are meters apart. The signal recorded in the axial direction of each unit sensor is referred to as component of the signal. The reception probe records, as a function of time, at least one component in a known vector direction, vertical or axial to the well measured, and two seismic components referred to as orthogonal, that is orthogonal to the component of known vector direction.

FIGS. 6a and 6b illustrate the basic physical principle of the propagation of a seismic shear wave (S-wave). There are two types of volume waves which are pressure waves (P-waves), whose polarization or direction of displacement of the formation upon passage of the wave is parallel to the direction of propagation (not shown in FIG. 6a) and polarized transverse waves (S-waves) substantially perpendicular to the direction of propagation which are illustrated in FIG. 6a.

FIG. 6a shows a diagram of a vertical plane of propagation 600. Surface 601 symbolizes not only the surface of the ground, but also the first heterogeneous formation layers up to about 200 meters thickness, or even the rough surface of the sea bottom, which are the location of conversions from P-wave mode to S-wave mode. All the wave modes propagate in depth along vertical axis 602. Thus, from a shallow formation, the S-wave propagates vertically in a substantially homogeneous medium on the scale of the seismic wave lengths being used. The medium is isotropic or with a low anisotropy for the vertical propagation direction (leading to an ordinary birefringence), and it comprises a possible stratification of the layers of variable characteristics, with an identical possible dip for all the layers or not. The medium is thus representative of usual sedimentary formations or of basements. The diagram of FIG. 6a illustrates a birefringent medium wherein a complex shear wave train propagates vertically in depth along axis 602 which comprises:

- a fast shear wave S-f having any vibration form 603 polarized linearly along the constant direction 611 orthogonal to propagation direction 602, and
- a slow shear wave S-s having a vibration form 604 generally different from 603 and polarized linearly along the constant direction 612 orthogonal to both propagation axis 602 and fast S-wave S-f polarization axis 611.

Polarization vectors 611 and 612 symbolize the directions of vibration of each eigenmode of S-waves propagated along the vertical, but also the amplitude of the signal. The amplitude of the vibration signal characterizes indiscriminately the displacement, the velocity or the acceleration of the seismic movement of each eigenmode of waves S-f and S-s, whose direction and wave form remain constant throughout the propagation, in accordance with the propagation phenomenon physics. FIG. 6a shows, for successive propagation times ti 610 (i=0, 1, 2, i) measured from the time of activation of the seismic surface source, the depth $z_f i$ 613 reached by fast wave S-f and the depth $z_s i$ 614 reached by slow wave S-s. The foot of the respective polarization vectors 611 and 612 indicates the exact depth reached by each one of the two S-waves at the time ti 610. In fact, depth $z_f i$ 613 of fast wave S-f is progressively and slightly greater, by some percent, than depth $z_s i$ 614 during the propagation.

FIG. 6b shows in the horizontal plane 650, orthogonal to the vertical propagation direction, projection diagrams of the theoretical vibration movement forms of the S-wave train. They each represent a continuous succession of the points [X(t), Y(t)] of the seismic signals, in a time window centered, in the present case, around the arrival time ti of the S-wave to be illustrated. These diagrams are also known as "particle movement" diagrams if signals X and Y represent a displacement upon passage of the seismic wave, or even "hodograms" and if signals X and Y represent a velocity of displacement measured for example by a sensor of geophone type. They are also referred to as "polarization diagram" or simply "polarization" if signals X and Y indiscriminately represent a displacement, a velocity or an acceleration.

FIG. 6b shows in the right column 653, below indication "IN", for successive fixed vertical depths zi (i=0, 1, 2, i) 660 reached by the S-wave train in a time window around propagation times ti 610 (i=0, 1, 2, i) defined in FIG. 6a. The theoretical polarization diagrams 651 are a totally random orientation in the horizontal plane for each depth station zi, which is observed in the reference frame of a seismic well probe used for VSP recording and anchored onto the well wall along a random azimuth. The uncertainty of rotation of the logging cable to which the well probe is fastened is well known to the person skilled in the art. This uncertainty is transmitted to the seismic sensors fixedly mounted in a probe. Furthermore, if the reception probe comprises cardans of the turret type on which the seismic sensors are mounted, the rotation of the cardans about the axis of the probe is free when the probe is in a vertical well, which also leads to a random orientation of the horizontal sensors, even if the azimuthal orientation of the probe was known.

FIG. 6b symbolically shows process P1 (666) according to the invention, via an arrow between each input data polarization diagram 651 in the right column "IN" 653, and the corresponding oriented polarization diagram in the left column "OUT" 663. This process determines the maximum amplitude direction 652 in diagram 651, independently for each well survey measurement depth, by the known technique of linear regression of the group of points X(t), Y(t) in a suitable limited time window which is if possible shorter than the time window corresponding to diagrams 651 or 661. Then a vertical axis rotation is applied to the horizontal seismic signals so that the maximum amplitude direction 651 coincides with an arbitrary constant azimuthal direction 662 in diagram 661. This process is well suited to the case of VSPs referred to as zero-offset profiles in vertical wells, where the P-wave source commonly used generates unintentionally and very often in practice energetic shear waves upon passage through the weathered and heterogeneous surface zone or the rough surface of the sea bottom.

FIG. 6b shows in the left column 663, below indication "OUT", and for successive fixed vertical depths zi (i=0, 1, 2, i) 660 reached by the S-wave train in a time window around propagation times ti 610 (i=0, 1, 2, i=defined in FIG. 6a. The theoretical polarization diagrams 661 are expected in a fixed frame of the horizontal plane, for example a geographic reference frame (North, East). For example $zi=(z_f i+z_s i)/2$ is taken with reference to FIG. 6a. It should be noted that, in the case of isotropy of the propagation medium for the vertical direction, that $zi=z_f i=z_s i$ represents the depth reached by any two orthogonal polarization S-waves. The polarization diagrams 661 of FIG. 6b show the particle movements of the S-wave train illustrated by FIG. 6a, for the same succession of propagation times ti. It should be noted that the successive diagrams in the left column 663 have very similar forms, with an identical maximum amplitude direction 662. The rotundity differences observed typically show the azimuthal anisotropy of birefringence resulting from the small velocity difference between a fast S-wave S-f and a slow S-wave S-s. Considering the time length of the seismic wavelets 603 and 604 (FIG. 6a) associated with the two eigenmodes S-f and S-s emitted quasi-simultaneously, the form of the diagrams of FIG. 6b is elliptical and indicates the interference of the two S-wave eigenmodes that can unfortunately not be visually distinguished in practice in the general case in this type of diagram. It is known by experience that for an individual energetic seismic arrival of a P-wave of linear polarization or of an S-wave of elliptical polarization, P or S-waves have a polarization remaining substantially constant throughout the propagation, shows a time coherence of the amplitude extrema from one depth to the next. In particular, the form of the module signal remains substantially constant for a high-energy descending wave. Publications show hodograms of direct S-wave trains emitted by a source S located at a short distance from the well which are re-oriented in a fixed geographic frame by an offset P-wave source activated in the same measuring pass which indicate that the hodogram form is substantially stable throughout the propagation along the vertical well and in a horizontal-stratigraphy medium comprising a notable S-wave azimuthal anisotropy. See:

Charles Naville, "Detection of Anisotropy Using Shear-Wave Spitting in VSP surveys; Requirements and Alpplications", SEG Expanded Abstracts, 56$^{th}$ int. SEG meeting, 1986, Houston, S5.2, pp. 391-394.

Ian Bush and Stuart Crampin, "Paris Basin VSPs: Case History Establishing Combinations of Fine Layer (or Lithologic) Anisotropy and Crack Anisotropy from Modelling Shear Wavefields Near Point Singularities" Geophys. Journal Int., 1991, No 107, pp. 433-437.

Nicoletis, L., Cliet, C. & Lefeuvre, F., "Shear-wave Splitting Measurements from Multishot VSPData, Expanded Abstracts, 58$^{th}$ in SEG meeting, 1988, Anaheim, POS 6.1, pp. 527-530.

In the aforementioned three documents, the hypothesis of the polarization fixity of the eigenmodes (FIG. 6a) for a given propagation direction is admitted explicitly or implicitly, and it can be visually checked that, for a propagation that is vertical to slightly deviated with respect thereto, the form of the polarization diagram remains similar with the propagation, as well as the azimuthal direction of maximum amplitude. Thus, even in the presence of birefringence anisotropy without a drastic amplitude differential attenuation between the two S-wave eigenmodes, it can be readily checked mathematically that the maximum amplitude direction of a two-component signal of a non-interfered direct S-wave train remains substantially fixed along a given propagation direction. This is schematized in the left column of FIG. 6b. Thus, by determining the azimuthal direction for each depth at which a record of the horizontal components is available, a unique reference frame is defined. This method is all the more precise since (1) the mechanical coupling of the single-level reception probe or of each reception probe of a multi-level well tool provides good vector fidelity, and since (2) the surface source remains in fixed position and always emits the same signal form throughout the VSP operation.

Figure 7:
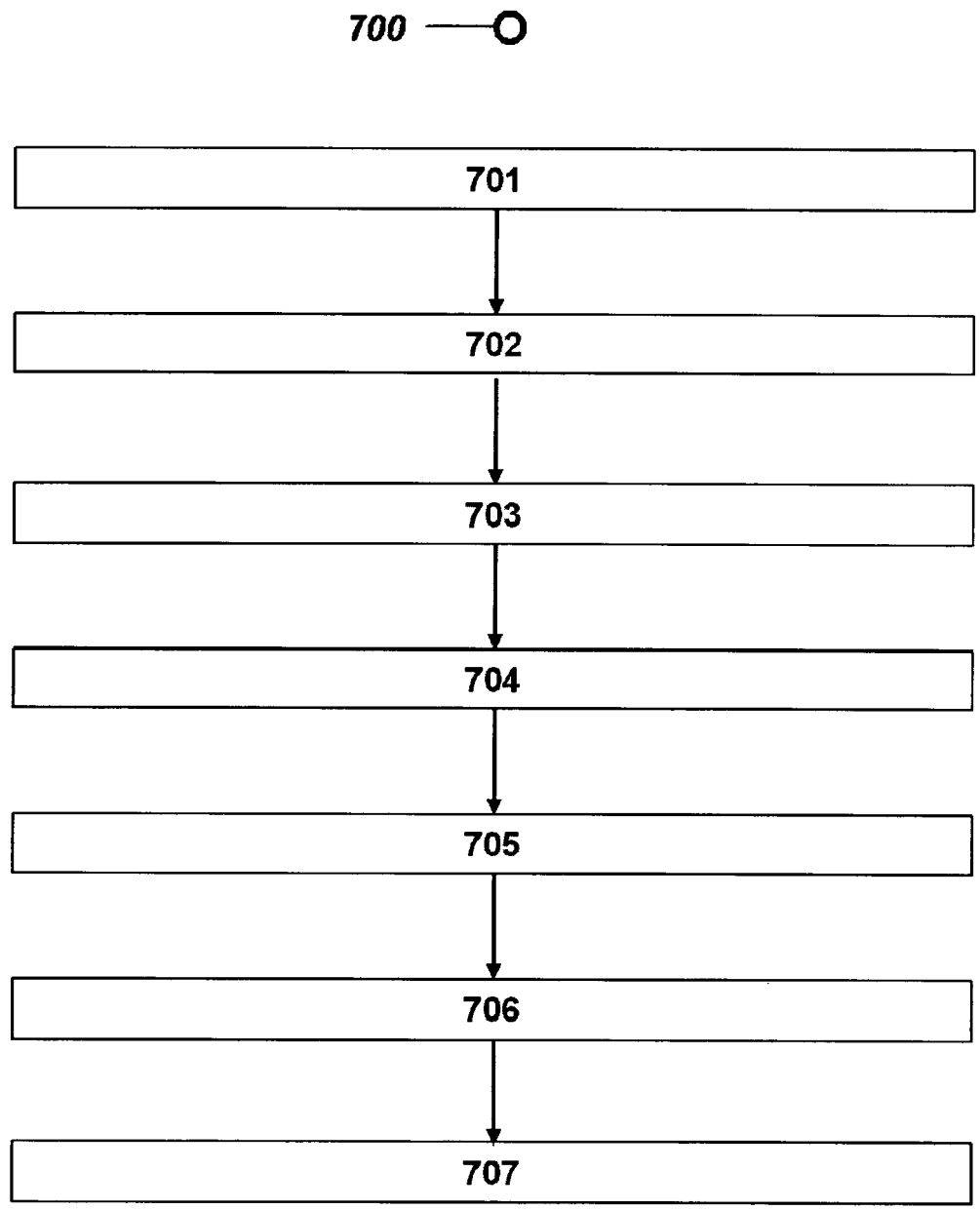
FIG. 7 is a flowchart of the entire orientation process according to the invention.

The method comprises orienting the seismic components in a locally coherent reference frame whatever the depth of the probe. FIG. 7 is a flowchart 700 of an embodiment of the orientation method according to the invention. It orients the two components orthogonal to a vertical component or to a component axial to the well. The method is based on the analysis of the descending S-waves to define a time window necessary for determination of an angle of rotation. In fact, the recorded P-waves usually have too low an energy on the horizontal components of the VSPs which do not allow o re-orientation of these components. This is notably the case for zero-offset VSPs, obtained with pressure wave sources in wells whose trajectory is close to the vertical. On the other hand, the energy of the direct S-waves or of the waves converted from P to S-waves during the descending propagation is very often sufficient to apply the method.

Thus, according to an embodiment, the method comprises the following stages for each measurement depth station:

In block 701, the two orthogonal components to be oriented are deconvoluted in an isotropic manner, that a single operator is applied at the same time on both components. This operation is carried out only if the result of operations 702 to 704 is not satisfactory;

In block 702, the module M(t) of the two raw components to be oriented, or an exponential power (n) thereof, is calculated;

In block 703, module M(t) is filtered so as to remove its low-frequency components and possibly high frequencies containing only noise, so as to facilitate the next operation;

In block 704, the time Tp of a remarkable phase of the signal of the filtered module obtained above is picked. For example, an amplitude peak or trough is picked, possibly refined by applying an industrial correlation or semblance picking algorithm;

Operations 702 to 704 can be automatic, performed in cascade and in a single pass, but they can lead to a poorly reliable pick or a poorly accurate pick. In such a case, it is possible to either modify the filter of block 703, or to consider applying, prior to operations 702 to 704, the operations described in block 701 which is intended to increase the signal-to-noise ratio of the S-wave to be picked in which all the arrivals interfering with the desired S arrival are considered to be noise;

In block 705, a time window is then defined around the S arrival time picked, of constant length for all the measuring depth levels and at least equal to a half period of the filtered module signal, or even of greater length in case of an interfered S-wave or of a low signal-to-noise ratio;

In block 705, the azimuthal direction is determined by maximizing the energy of the raw or filtered input components X(t) and Y(t) to keep only the frequencies with the highest signal-to-noise ratio, according to a known industrial process. Rotation of the raw input components X(t) and Y(t) is then achieved in the plane orthogonal to the Z raw component, in an intermediate unique reference frame defined by the azimuthal direction calculated above. The amplitude of the output signal in the maximization direction is checked to see if it remains of identical sign, positive for example, at the picked time Tp from operation 704, for all the PSV measurement levels;

In block 707, the components are calibrated in a unique intermediate reference frame defined with respect to a geographic frame, or to a frame linked with the known well trajectory if additional information is available therefore; and In block 708, the rotations required for the unique intermediate reference frame to restore the three VSP components in a geographic frame linked with the globe are applied according to a known procedure.

Each one of the above stages is described hereafter.

A. Picking

Block 701: Optional Prior Deconvolution

In some cases, the signal of the direct arrival S-wave train is apparent in a wide recording time interval. It is potentially interfered with by other waves of lower but non-negligible relative energy, which has the effect of making picking of the filtered module more imprecise. It may be useful in such cases to apply a multi-channel isotropic deconvolution operation, identical for the two "horizontal" components (orthogonal to the substantially vertical direction) of each measurement depth level, and identical at several depth levels. This allows reducing the length of the S-wave train on which the arrival time is to be picked. Deconvolution can be performed by extraction of the P-wave signal on the vertical component, in order to deconvolute a converted P-S wave on the two horizontal components, for example according to the method described in the patents by Nigel Anstey, GB-1,569,581 of 27 Sep. 1977, or CA-1,106,957 of 9 Dec. 1977, entitled "Seismic Delineation of Oil and Gas Reservoirs Using Borehole Geophones". Deconvolution can also be carried out simply with the existing isotropic and multi-channel industrial algorithms for well or surface surveys, of Wiener type, or also with frequency spectrum balancing algorithms, both based on the amplitude spectrum of the sum of the autocorrelation signals of each orthogonal horizontal component to be deconvoluted, considering the invariance of this autocorrelation signals is summed with respect to the orientation of the two input horizontal components.

Block 702: Calculation of the Module Signal M(t) of a Two-Component Signal and Invariance After checking that the basic operations of pre-processing the unit VSP records, such as editing, vertical stacking, optional pre-stack source amplitude normalization, etc., have been carried out in an isotropic manner, the module signal, denoted by M(t), which represents one of the polar coordinates deduced from the two raw signals in Cartesian coordinates X(t) and Y(t,d), is calculated as follows:

$$M^2(t)=X^2(t)+Y^2(t), \text{ for any time } t$$

If the VSP tool, whose coupling with the wall is mechanically isotropic, is anchored at a given depth with a different azimuthal direction of unknown angle az around the axis of the vertical well, the tool records the horizontal components X1(t) and Y1(t) that are expressed as follows as a function of X(t,d) and Y(t,d):

$$X1(t)=X(t)\cdot\cos(az)+Y(t)\cdot\sin(az)$$

$$Y1(t)=-X(t)\cdot\sin(az)+Y(t)\cdot\cos(az)$$

It can be readily noted that, for any value of angle az:

$$X1^2(t)+Y1^2(t)=X^2(t)+Y^2(t)=M^2(t)$$

The module remains identical whatever the orientation of the sensors associated with components X(t) and Y(t). The module is thus invariant with respect to the rotation, with an always positive value. The module of a two-component signal is also referred to as "M2" in the rest of the description hereinafter. The module of a three-component signal, referred to as "M3", defined by:

$$M^2(t)=X^2(t)+Y^2(t)+Z^2(t),$$

is also invariant with respect to any spatial rotation.

Figure 2B:
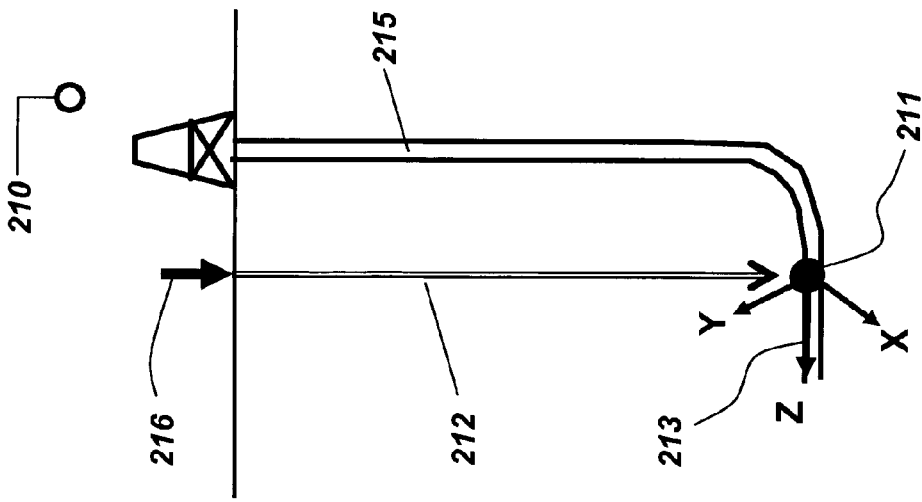

It is of interest to calculate module M3 when trying to pick a direct pressure (P) wave whose arrival direction is orthogonal to the well in some configurations of the acquisition geometry. For example, in some well measurement intervals close to the horizontal, when the source is located close to the vertical of the 3C seismic sensor, as illustrated in FIG. 2b, or in the offset-VSP and walkaway type acquisition configurations, in some well intervals close to the vertical, when the surface seismic source is sufficiently remote from the well, the seismic ray reaches the well with a horizontal incidence, as illustrated in FIG. 2c. Since this P arrival picking procedure is valid whatever the incidence of the ray, direct P-wave picking is automated by picking module M3, in particular for 2D walkaway and 3D walkaway type surveys. The latter configuration is also known as 3D-VSP.

It may also be decided to work on an exponential power of signal M(t), in order to amplify the amplitude variations of this signal.

The advantage of the invariance property of the module is that it allows precise picking operations of the time of a remarkable phase, linked with a particular time of the S-wave arrival train, for example with a well-individualized local extremum, without knowing the prior orientation of the signals making up the module.

Block 703: Filtering Module M(t)

According to a preferred embodiment, the method comprises filtering module M(t) to remove its low-frequency component and to make this signal more readable. A 5-60 Hz band-pass filter can typically be used for example for VSPs.

Block 704: Time Picking of a Particular Extremum of the Filtered Module Signal Picking of the time Tp of an amplitude extremum of the module, which is preferably filtered, is described in connection with FIGS. 6c and 6d.

Figure 6D:
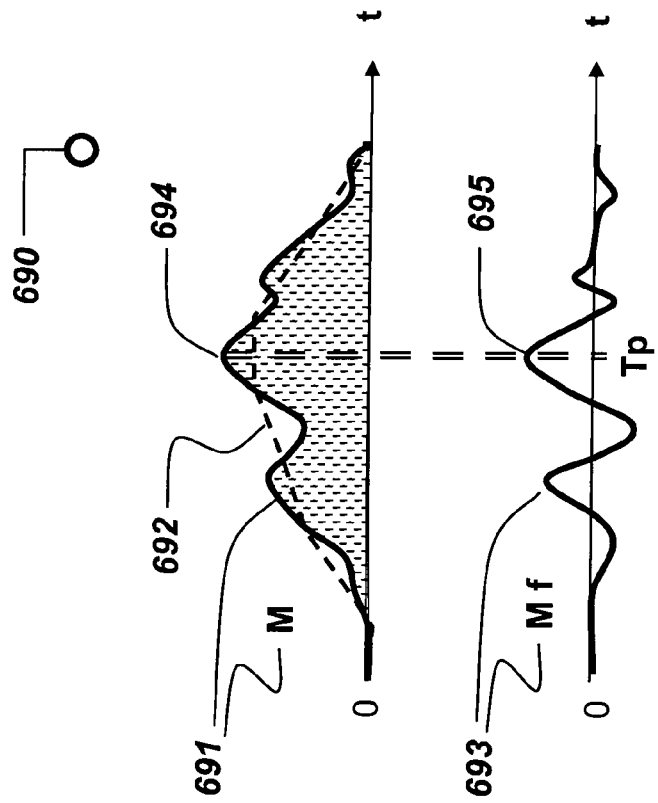
Figure 6C:
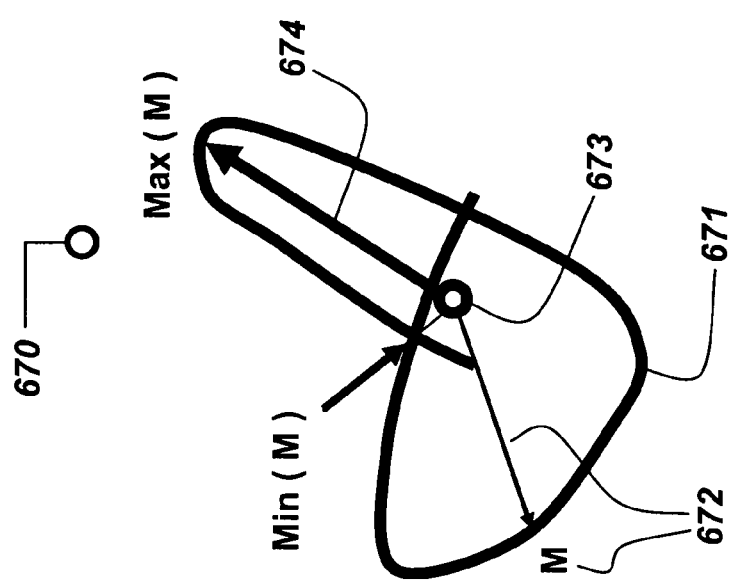

FIG. 6c shows a horizontal projection 670 of a polarization diagram 671 of a direct S-wave train arrival selected in an appropriate wide time window.

Module signal M(t) 672 is diagrammatically shown as one of the polar coordinates derived from the two raw orthogonal recorded signals X(t) and Y(t) in Cartesian coordinates and of arbitrary orientation.

By definition, whatever the time t: $M^2(t)=X^2(t)+Y^2(t)$.

Signal M(t) 672 has the mathematical characteristic of being invariant with respect to the Cartesian reference frame of the measured raw signals X(t) and Y(t), and wherein the module is calculated. Similarly, the form of polarization diagram 671 in the time window being considered is independent of the frame, to within a rotation. The raw signal vectors X(t) and Y(t), as well as module vector M(t), have the same origin 673 (zero of the amplitudes) with the amplitude of vector M(t) always being positive or zero.

Considering that the polarization diagram of the direct S-wave considered is also quasi-constant during the seismic propagation in depth, the method according to the invention allows determination with precision the time pick of a remarkable phase of the non-oriented S-wave signal, which is independent of the Cartesian reference frame of the raw signals X(t) and Y(t) such as for example the time of one of the local maxima 674 of module signal M(t) 672.

FIG. 6*d* shows a schematic example, as a function of time t, of the module signal of the S-wave train whose energy is higher than that of all the other waves received at the same time by the seismic sensor. It is noted, by experience, that this module signal remains substantially identical according to the recording depth, with a time lag corresponding to the propagation of the S-waves. In practice, in order to amplify the recognition of the local extrema of the module signal, the low-frequency components are removed by a low-pass filter whose result is filtered signal Mf 693, which also represents the difference between raw signal 691 and the associated smoothed signal 692. It is also possible to raise the amplitudes of filtered signal Mf to an exponential power in order to facilitate picking thereof by a visual method, or by semblance or correlation calculation between VSP measurement depth stations. The time Tp of the amplitude peak 695 is in practice easier to pick, without ambiguity, on filtered signal Mf 693 than peak 694 on raw signal M 691, whether to the naked eye or with most industrial time picking algorithms.

The method according to the invention, which allows precise picking of a remarkable phase of a shear wave signal with two orthogonal components in the polarization plane without prior orientation, leads to immediate applications. In fact, this type of picking allows knowing an S-wave arrival time that is identical, to within one constant, for all the VSP measurement depth stations, and consequently to know the S-mode interval velocities. By combining the S time with the P-wave time measurement generally performed on the component that is vertical or axial to the well, access is provided for example to the interval velocity ratio Vs/Vp and to the Poisson coefficient. Access is also provided to the Young's modulus if the formation density is known. This invention also allows picking an S-wave on data obtained from ultrasonic S-wave logging tools of dipole or quadrupole type, comprising flexural wave sources and receivers, with the tool orientation having to be known. This can lead to design simplifications and to a decrease in the operating cost since the material orientation-measuring elements are no longer necessary.

B. Orientation in a Unique and Coherent Reference Frame

Block 705: Determining the Azimuthal Direction of Maximization of the Energy of the Two Raw Components to be Oriented and Rotation of the Input Signals in a Coherent Intermediate Reference Frame A calculation time window is defined by a constant time interval of the order of 10 ms to 20 ms on either side of the picked time Tp on the filtered module, so that the time window encompasses at least a half period of the dominant period of the picked arrival. The invariance of the module signal with respect to the orientation of the sensors leads to the coherence of the picked time of the S arrival, and it consequently guarantees its validity for further uses or for knowledge of the S-wave velocities as a function of depth.

Reference is made back to the raw signals X(t) and Y(t) for each VSP measuring depth, which are optionally filtered by cutting the noise-containing high frequencies. Then the azimuthal direction is sought that maximizes the seismic energy in the plane of the two input components and in the time window defined above, using a common energy maximization technique as described in the aforementioned documents:

DiSiena, J. P., J. E. Gaiser, and D. Corrigan, 1984, "Horizontal Components and Shear Wave Analysis of Three-Component PSV Data", in M. N. Toksöz and R. R. Stewart, eds., Vertical Seismic Profiling, Part B: Advanced Concepts: Geophysical Press, 177-235;

Benhama, A., Cliet, C., and Dubesset, M., 1988, Study and Application of Spatial Directional Filtering in Three Component Recordings: Geophysical Prospecting, 36, 591-613.

The component corresponding to this maximization direction is denoted by Hmax(t). The angle calculated between Hmax(t) and first component X(t) is denoted by amax180 and it is known only to within 180°. This indetermination is removed by choosing, for example, that the amplitude of output component Hmax is imperatively made positive at the time of the picked time Tp for any measurement depth, using the following procedure:

if Hmax (Tp)>0, then we define an angle amax360=amax180, expressed in degree S if Hmax (Tp)<0, then we define an angle amax360=180+amax180.

Figure 8:
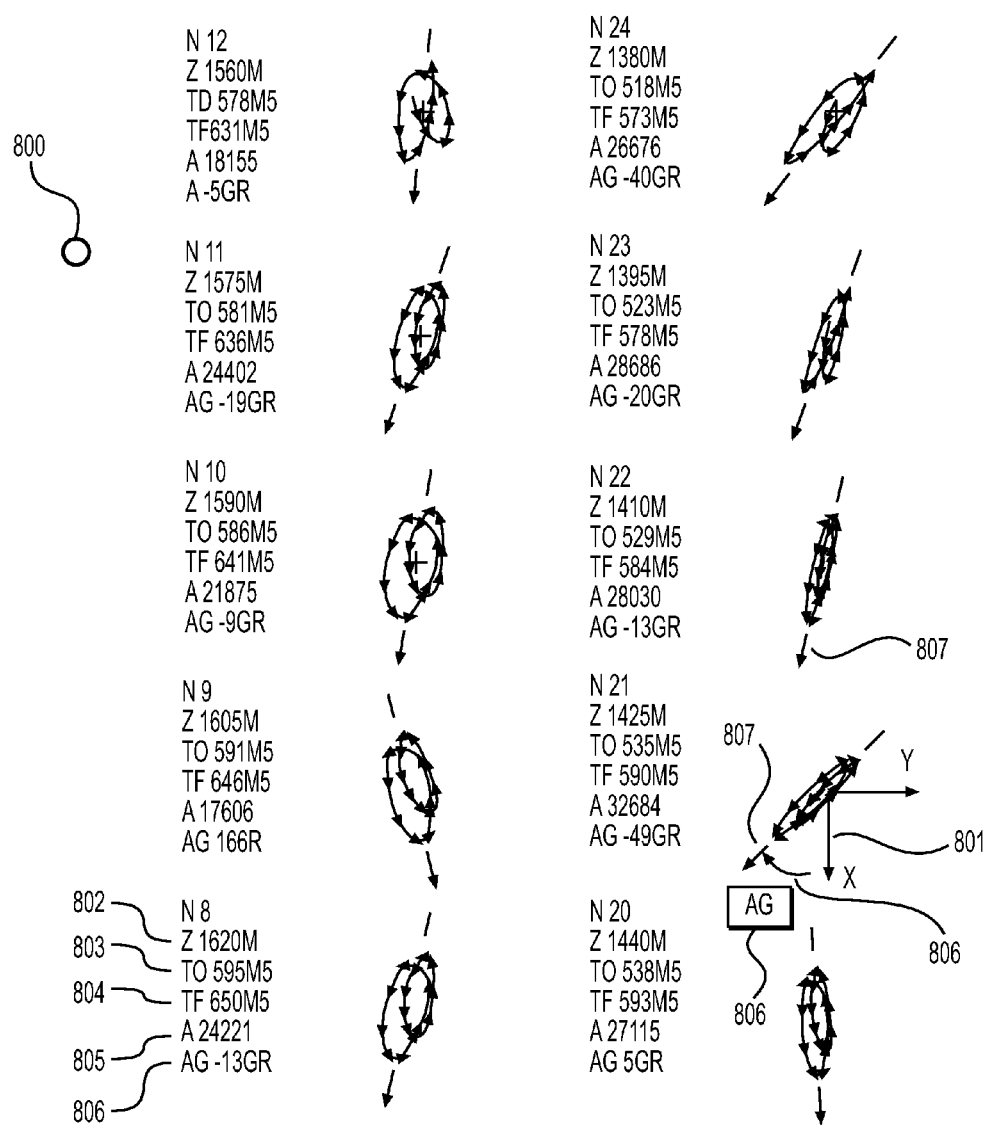
FIG. 8 illustrates the particle motion of the descending S-wave in the orientation calculation time window, in the frame of the tool with a calculated angle AG corresponding to the arrow superposed on the hodogram indicates the maximization azimuth.

FIG. 8 shows polarization diagrams 800 of hodogram type, drawn in reference frame 801 of the raw horizontal components X and Y of a real VSP, recorded in a vertical well with a very low offset source, and a well tool comprising three fixed sensors without orientation accessories and whose mechanical coupling provides good vector fidelity. On the left of each hodogram is a caption indicating the VSP measuring depth 802, the time in milliseconds of the start 803 and the end 804 of the 55-ms maximization calculation window that follows the time pick performed beforehand on the filtered module and the maximum value 805 of the amplitude of the signal vector 807 calculated in the angular maximization direction AG 806 expressed in grade (GR) from the reference component X 801 of the well tool in an anti-clockwise direction. Angle 806 denoted by AG in FIG. 8 corresponds to angle amax360 defined above modulo 360 degrees or 400 grades.

The subsequent rotation of the raw components X(t) and Y(t) of angle amax360 that is applied over the entire length of the recorded signal allows obtaining output signals in a unique reference frame that makes them coherent as a function of depth. A possible constant can be added to angle amax360.

Figures 9A, 9B, 9C:
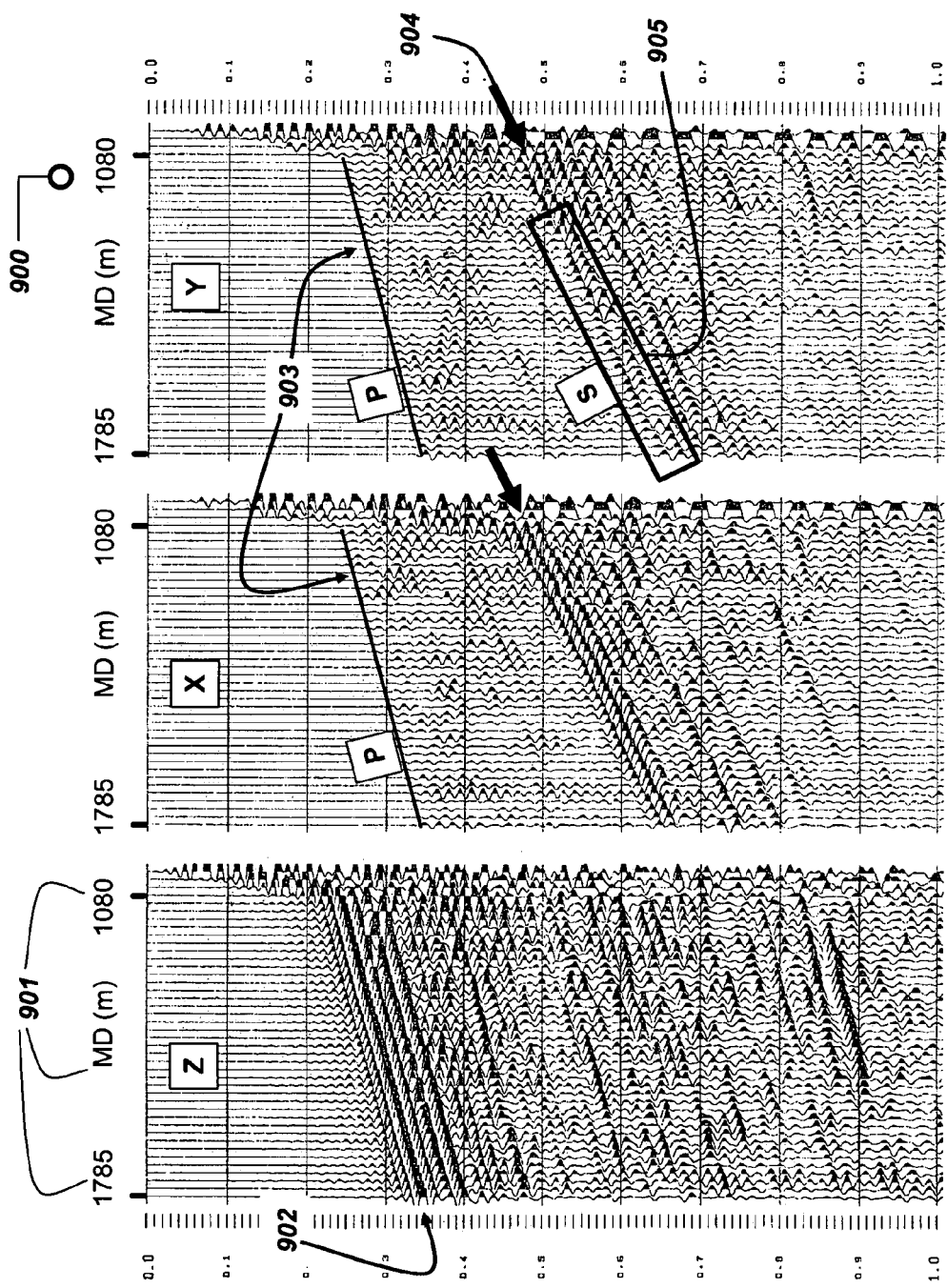
FIGS. 9a, 9b and 9c represent the isotropic raw replays of the respective oriented geographic components Z-down vertical, H-North (HN) and H-East (HE) of the tool, versus the increasing depth from left to right, and the coherence obtained on the S arrival in the rectangular window illustrates the efficiency of the method of orienting the two orthogonal components according to the invention.

FIGS. 9 and 10 show the three VSP components before and after orientation. FIGS. 9*a*, 9*b* and 9*c* show the isotropic raw replays 900 of the respective vertical Z and horizontal X and Y components of the well tool, as a function of the measured depth MD 901 increasing from left to right. The replay is referred to as "3C normalized isotropic" which means that a constant gain has been applied identically to the amplitudes of the three components, which is variable as a function of depth so that the direct P-wave arrival amplitude on vertical component Z is identical at any depth. The direct P-wave arrival 902 is nearly invisible on the horizontal components X and Y on which the P-wave time is indicated by a line 903. A direct S-wave arrival 904 is clearly identified on the horizontal components X and Y by its slope that is greater than that of the P-wave 902-903, and coherence defects are observed in the S-wave form in rectangle 905. These defects are associated with the random orientation of the horizontal sensors and the direction of maximization of the direct S arrival illustrated in FIG. 8.

Figures 10A, 10B, 10C:
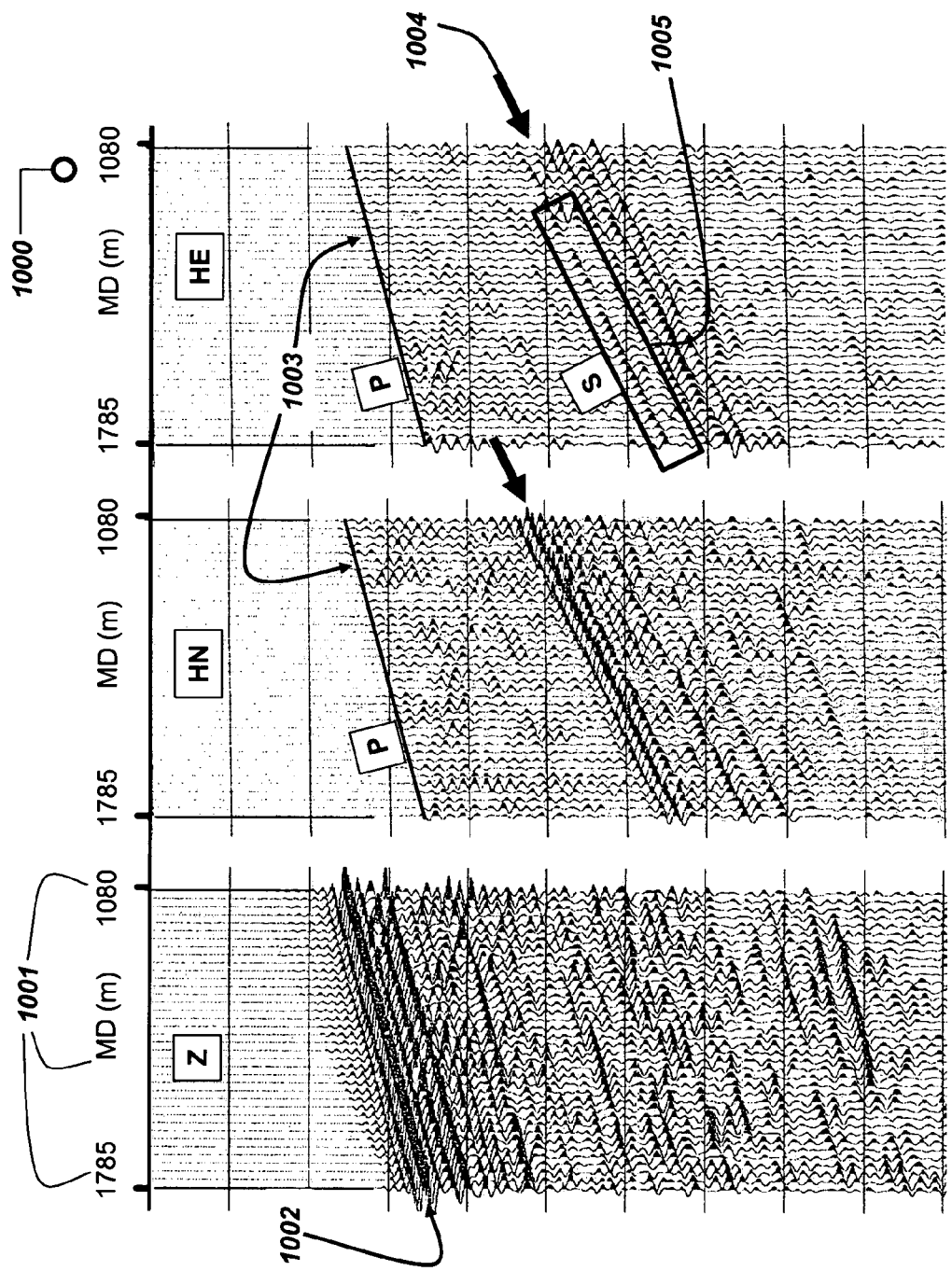
FIGS. 10a, 10b and 10c represent after orientation normalized isotropic replays of vertical and horizontal components oriented in geographic directions.

FIGS. 10*a*, 10*b* and 10*c* represent the 3C normalized isotropic replays 1000 of the respective oriented vertical Z and horizontal HN and HE components oriented in the respective geographic directions North and East, as a function of depth MD 1001 increasing from left to right, with the same time and depth scales as in FIGS. 9*a*, 9*b* and 9*c*. The four least deep measurement levels are missing. The direct P-wave arrival time 1002 is represented by line 1003 on the horizontal components HN and HE. The coherence of the direct S-wave arrival 1004 on the horizontal components HN and HE in rectangle 1005 is much better than in the corresponding rectangle 905 of FIGS. 9*a*, 9*b* and 9*c*, which confirms the good orientation is obtained.

At this stage, the three components are oriented to within 360° in a substantially unique reference frame. This frame is therefore coherent for each depth. This pre-processing allows performing processing of the three isotropic components even if this frame is of unknown azimuthal direction.

C. Orientation in a Geographic Frame

Block 706: Calibration of the Intermediate Coherent Frame with Respect to the Geographic Frame It is advisable, when possible, to additionally orient the horizontal components in a unique frame of known geographic orientation. It is therefore necessary to determine the geographic orientation of the intermediate unique frame obtained at the end of the operations of block 705 in FIG. 7. This operation of azimuthal calibration of the unique frame allows geological interpretation of the results of the subsequent three-component VSP processing, as mentioned in U.S. Pat. No. 6,076,045, focussed on the determination of the dip and azimuth of seismic reflectors.

Several methods of calibrating the unique frame can be used:

a) It is possible to use, for example, the residual energy of the P-wave arrival that is sometimes higher on the horizontal components of the least deep VSP measurement levels, by conventionally assuming that the polarization of the direct P-wave is in the azimuthal direction of the segment that connects the position of the source and that of the sensor. This has been done to obtain FIG. 10, by carrying out an additional rotation of constant angle with respect to the azimuthal direction of maximization of direct arrival S, so as to orient the horizontal components in the geographic representation frame of FIG. 10. In fact, the direct P-wave arrival 1003 has a vertical incidence of the order of 10 degrees on the least deep levels located between 1000 m and 1100 m for the data of the VSP shown in FIGS. 9*a*-9*c* (measured depth 901) and in FIGS. 10*a*-10*c* (signals on the right side of the figures).

b) Alternatively, it is possible to use directional measurements of the three components by various complete or partial orientation measuring tools or accessories, if the latter have been lowered coupled with the single-level VSP tool.

The orientation is referred to as complete when all the parameters allowing the orientation (relative bearing angles, vertical well deviation angle and deviated well azimuth angle) are measured at all the VSP measurement depth levels. This is possible with a gyroscope type tool coupled with the single-level VSP tool.

The orientation is referred to as partial if the orientation measurement tool is coupled with at least one of the measurement satellites of the VSP seismic tool, if the latter comprises several simultaneously measured depth levels. The orientation is also referred to as partial if the orientation measurement is limited to a given depth interval (such as, for example, the limitation to the open-hole well interval, that is not cased with metal tubes for a tool detecting the direction of the magnetic North) or to a well deviation angle range (such as, for example, devices of an inclinometer type, relative bearing measuring pendulum and cardans, sensitive to gravity, and made inoperative for low vertical well deviations).

Figure 3B:
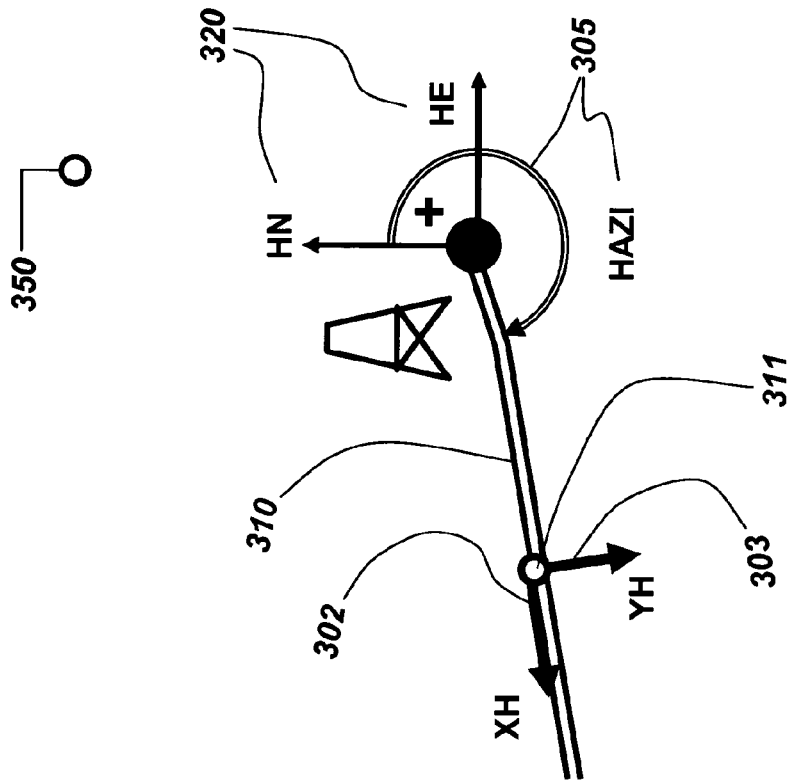
FIGS. 3a and 3b show the layout of the three components of a triaxial sensor mounted on double cardans of "turret" type, and placed in a deviated well: vertical plane tangential to the well (FIG. 3a), horizontal plane (FIG. 3b)
Figure 3A:
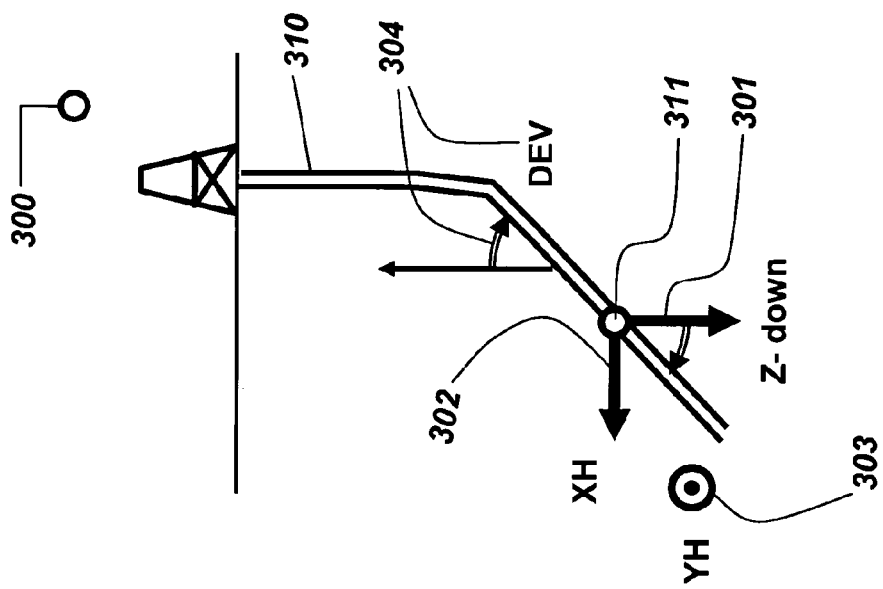

Block 707: Rotations of the Seismic Signals Between the Intermediate Coherent Frame and the Geographic Frame, when the Tool Orientation is Partial In order to facilitate understanding of the invention and of the object thereof, hereafter is a brief panorama of the known material means of orienting seismic and non-seismic well tools:

means for exhaustive and precise orientation of a well probe at a high operating cost: the logging industry has magnetic orientation means locating the direction of the Earth's magnetic field, when operating in an open hole, often combined with precise inclinometers made insensitive to vibrations and capable of performing continuous measurements while pulling the logging tools, also under continuous operating conditions. Precise inclinometers provide the relative bearing of a tool in a cased well from some degrees of the vertical inclination of the well, the trajectory and the angles of inclination and of the known azimuth of the well. Well gyroscopes are also commonly used for precise measurement of the well trajectory. Their use in combination with other logging tools is sporadic but not rare. Using the means described above, the orientation of the components is then perfectly measured in an open or cased well.

means for partial and little precision orientation, but inexpensive, of a well probe:

a) For deviated wells of known trajectory, it is usual to mount the triaxial sensors on double cardans with a so-called "turret" architecture, comprising an axis of rotation parallel to the axis of the well, and a horizontal axis perpendicular to the vertical plane locally tangent to the well. FIGS. 3*a, b* show the layout of a triaxial seismic sensor 311 mounted on such cardans and placed in a deviated well 310: FIG. 3*a* shows a projection 300 in the vertical plane tangent to the well 310, which comprises vertical component Z-down 301, oriented downwards, and horizontal component XH 302 oriented in the azimuth of the increasing measured depths of the well. The other horizontal component YH 303 is orthogonal to the illustrated tangent vertical plane. The vertical inclination angle of the well 304, or deviation, is commonly referred to as DEV in the industry. FIG. 3*b* shows a top view of projection 350 in the horizontal plane. The trajectory of the deviated well 310 appears as any line in the geographic frame 320; the horizontal component XH 302 is tangent to the well at the level of the position of sensor 311; horizontal component YH 303 from a top view is at +90° with respect to XH 302. The seismic components HE and HN which are oriented in a geographic frame 320 are recalculated from components XH 302 and YH 303 by rotation of angle HAZI 305 about the vertical, HAZI 305 which corresponds to the azimuth of the well locally in the position of sensor 311. Angles DEV 304 and HAZI 305 are generally known and measured independently of the VSP operation through the very precise well trajectory measurements which are performed using the aforementioned gyroscope or magnetometer-inclinometer. Mounting the triaxial sensors on turret type double cardans allows orientation of the three-component seismic sensors by gravity in wells sufficiently inclined with respect to the vertical which is typically from a threshold value of the order of 10 degrees vertical inclination. This threshold can vary from one tool brand to the next. In practice, considering the frictional forces inherent in this type of mechanical device, orientation becomes more precise when the inclination of the deviated well increases. For low well deviation values below the threshold value of approximately 10 degrees, the orientation of the orthogonal components is not known. Of course there is an uncertainty of the same order on the real orientation of the Z-down component with respect to the real vertical direction, but this does not significantly alter the processing results or the subsequent interpretative conclusions.

b) Alternatively, it is usual to mount three-component seismic sensors fixedly in a VSP tool further comprising a device for measuring the relative bearing angle in the plane orthogonal to the axis of the VSP tool. Naturally, this type of device, commonly referred to as "relative bearing sensor", is inoperative in strictly vertical wells and it provides a relative bearing measurement that is significant only beyond a low well vertical inclination value, of the order of 10 degrees. The relative bearing measurement becomes increasingly precise when the deviated well inclination increases. FIGS. 4a and b show the layout of a triaxial seismic sensor fixedly mounted in the tool. FIG. 4a illustrates the definition of the relative bearing angle by the angle between the upper generatrix of the cylindrical well and a reference direction of the VSP tool in the plane orthogonal to the tool axis using a positive sign convention which is clockwise when considering the orthogonal plane in the direction of the increasing curvilinear depths of the well. FIG. 4a shows a top view of a projection 400 in the plane orthogonal to the Z-axis of the well 410, at the level of sensor 411. Arrow 412 indicates the direction of the increasing measured depths of the well. The relative bearing angle RB 430 is defined by the angle between direction XV 422 orthogonal to the axis of the well 410, contained in the vertical plane tangent to the well and pointing upwards, with reference direction X 419 of the sonde containing sensor 411, corresponding to the measured orthogonal seismic sensor X 419. Angle RB 430 is measured positively 431 with clockwise convention, considering the direction of arrow 412.

Figure 4B:
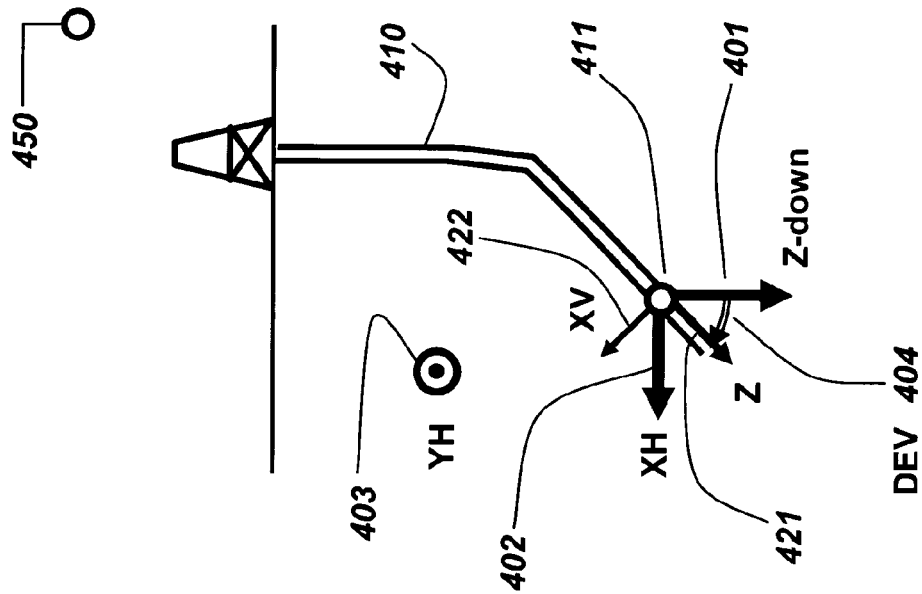
FIGS. 4a and 4b show the layout of the three components of a triaxial sensor fixedly mounted in the tool, in the plane orthogonal to the axis of the well and of the probe (FIG. 4a), which allows illustration of the relative bearing angle, and in the vertical plane tangential to the well (FIG. 4b)
Figure 4A:
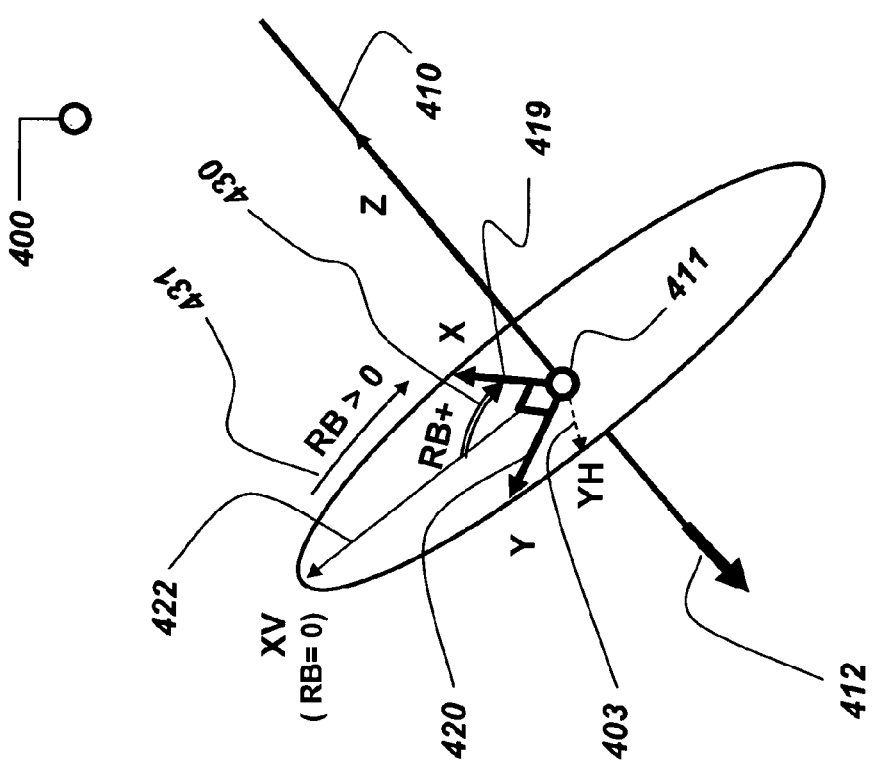

FIG. 4b shows a projection 450 in the vertical plane tangent to well 410 locally with respect to the position of sensor 411, which comprises component Z 421 measured by the tool, axial to the well and pointing downwards, and component XV 422 previously calculated in the direction of the axis origin of the relative bearing angle (RB=0). The horizontal component YH 403 is orthogonal to the tangent vertical plane. The vertical inclination angle of the well DEV 404 is shown between directions Z 421 axial to the well and Z-down 401 which is vertical seismic component oriented downwards. The horizontal component XH 402 oriented in the azimuth which increases with measured depths of the well and the seismic component Z-down 401 are obtained from components XV 422 and Z 421 by rotation of angle DEV 404 about axis YH 403.

Three partial orientation measurement configurations are considered below:

C1: The single-level well tool contains triaxial sensors mounted on double cardans with a "turret" architecture, as illustrated in FIGS. 3a and 3b, and in a limited depth interval containing at least one VSP measuring station with the well deviation being large enough (at least around 10 degrees) to allow rotation of the cardans under the action of gravity. Component Z-down 301 is then naturally oriented along the vertical (FIG. 3a). The geographic horizontal components 320 HN, HE (FIG. 3b) are obtained by rotation of measured components XH 302 and YH 303 about the vertical, of angle HAZI 305 known at 360 degrees, corresponding to the azimuth of the vertical plane tangent to the well in the position of the sensor.

[HE,HN]=Rot(HAZI). [XH,YH]

C2: The single-level well tool contains triaxial sensors mounted fixedly in the well tool, as illustrated in FIGS. 4a and 4b, and in a limited depth interval containing at least one VSP measuring station. The well deviation is large enough to allow precise measurement, to within some degrees, of the relative bearing angle B 430 illustrated in FIG. 4a. Three successive rotations are then applied in the following order:

[XV,YH]=Rot(RB). [X,Y], which is rotation in the plane orthogonal to the well axis;

then [XH, ZV-down]=Rot(DEV). [XV, Z] which is rotation in the vertical plane tangent to the well in the position of the well tool, as illustrated in FIG. 4b; and then [HE,HN]=Rot(HAZI). [XH,YH] which is rotation in the horizontal plane, as illustrated in FIG. 3b.

C3: The well tool comprises a plurality of reception probes located at adjacent measurement depths, which each contain triaxial sensors fixedly mounted in the well tool. One of the probes is combined with a complete orientation measuring tool. In this configuration, after rotation of one of the components orthogonal to the axis of the well in a unique reference frame, for all the depth stations measured with the probe coupled with the orientation measuring tool, the difference is calculated between the previous angle of rotation and the measured relative bearing angle, then the value of this difference is interpolated for the adjacent depth levels that are not subjected to orientation measurements. The interpolated difference angle obtained is the relative bearing angle RBi to be used for rotation of the orthogonal components of the intermediate frame. The three rotations described above for configuration C2 are then applied with relative bearing angle RBi being taken for the first one of the three rotations.

Figure 5:
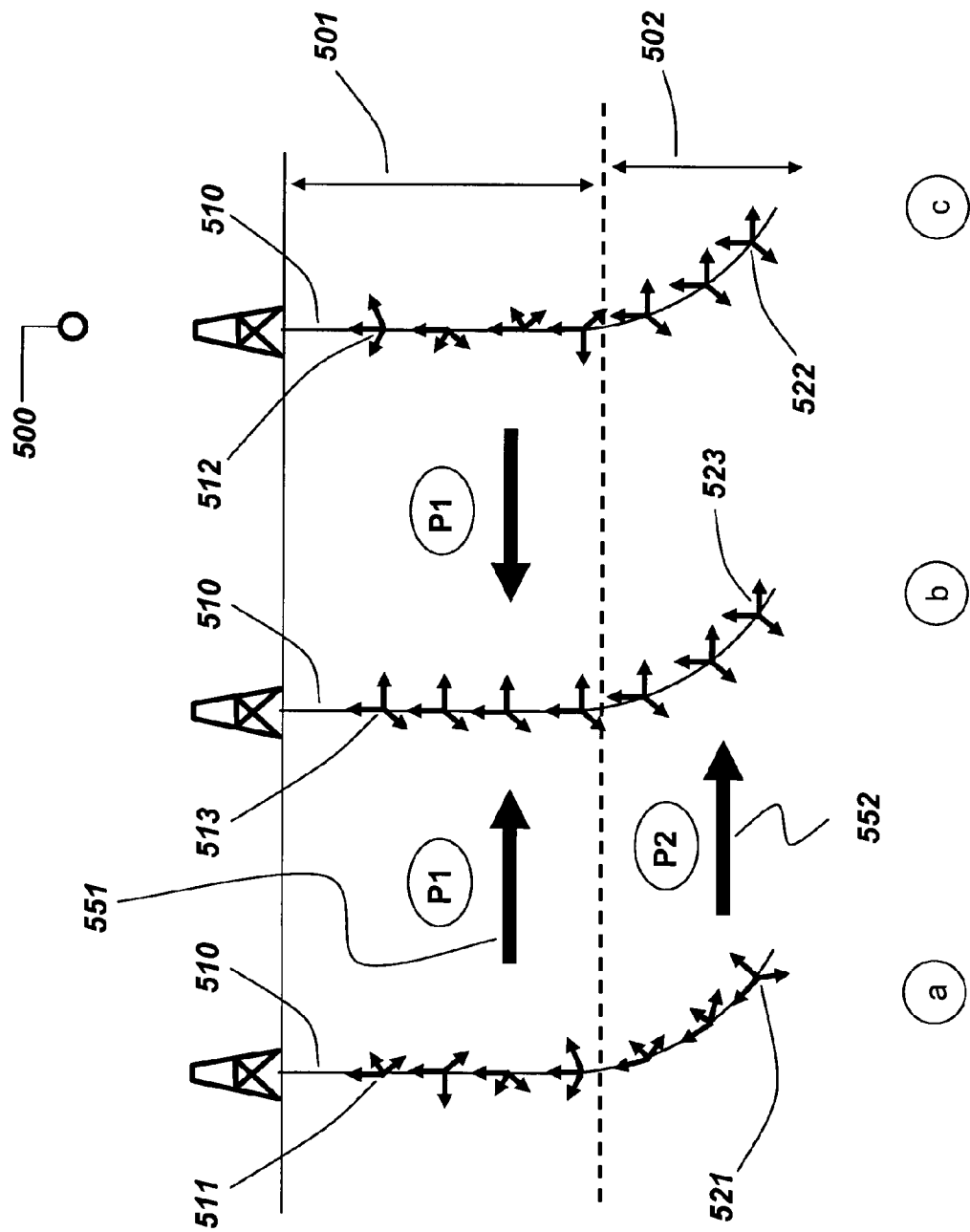
FIG. 5 illustrates the spatial attitude of the trihedra of the seismic sensors in the vertical and deviated parts of a well prior to orientation (a): fixed mounting, (c): mounting on double cardans, and configuration of the trihedra after orientation (b)

FIGS. 5a, 5b and 5c illustrate, in the vertical projection plane 500, the spatial attitude of the trihedra of seismic sensors 511 to 513 and 521 to 523 in a well 510 comprising a vertical part 501 and a deviated part 502 in the vertical plane 500 shown in projection.

The so-called vertical part 501 of well 510 symbolizes a depth interval for which the value of the vertical inclination is below the efficient operating threshold value of a double-cardan system, or of a system of pendular-gravity measurement of the relative bearing angle, which contains trihedra 511 to 513. The so-called deviated part 502 corresponds to an interval for which the vertical deviation angle of the well is above the threshold value which contains trihedra 521 to 523.

FIG. 5a shows the attitude of the trihedra corresponding to a fixed mounting of the three orthogonal seismic sensors in the well probe, including 511 and 521, where the axis of the sensor generally referred to as Z-tool is aligned with the axis of the well and points upwards. Trihedron 511 in vertical part 501 and trihedron 521 in deviated part 502 thus illustrate that the relative bearing angle that identifies the direction of the sensors orthogonal to the well axis with respect to the azimuth of the vertical plane 500 is random from one VSP depth station to the next. The measured value of the relative bearing can be used for orientation of the components only in deviated part 502 (See FIG. 4a and associated explanations).

FIG. 5c shows the attitude of the trihedra corresponding to a mounting of the three orthogonal seismic sensors on double cardans of turret type in the well probe, including 512 and 522, where the axis of one of the sensors is aligned with the vertical and points upwards. Trihedron 512 and the trihedra of the adjacent depth pointing in vertical part 501 thus illustrate that the azimuthal direction of the sensors orthogonal to the axis of the well is random from one VSP depth station to the next. By contrast, trihedron 522 in deviated part 502 illustrates that the orientation of the trihedron is entirely known. One of the horizontal components is in vertical plane 500 of the deviated part of the well trajectory and the other horizontal component is normal to plane 500 (see FIGS. 3*a* and 3*b*, and associated explanations).

FIG. 5*b* shows the known unique orientation of the trihedra obtained after applying the orientation procedures according to one of the embodiments of the invention, including 513 and 523, where the axis of one of the sensors is aligned with the vertical and points upwards. One of the horizontal components is in vertical plane 500 of the deviated part of the well trajectory and points in the azimuth of the increasing depths (identical to the direction of deviation of the well in the present case). The other horizontal component is normal to plane 500 trihedral Trihedrals 511 and 512 and the trihedra of the adjacent depth points of random orientation in vertical part 501 are re-oriented in a common frame of trihedron 513 or 523 by means of procedure P1 551 according to the invention. By contrast, trihedron 521 in deviated part 502 is re-oriented in the directions of trihedron 523 by means of two successive rotations according to known procedure P2 552 described above in comments regarding FIGS. 4*a* and 4*b*. Trihedron 522 in deviated part 502 is naturally oriented identically to trihedron 523 and its components require no intervention.

In practice, procedure P1 551 according to one of the embodiments of the invention is also applied to the trihedra of deviated part 502 immediately adjacent to vertical part 501, in a short overlapping and tying interval, for calibrating the azimuth of the horizontal components of the trihedra of the vertical part, including 511 and 512, on the known azimuth of the trihedra of deviated part 502. In the end, if it is desired to orient all the trihedra 513 to 523 shown in FIG. 5*b* in a geographic frame, an azimuthal rotation similar to the rotation described above (comments of FIG. 3*b*) is applied.

Applications of the Invention

The method according to the invention can be applied within the context of seismic prospecting using a conventional VSP method with a very low offset of the single source position, in order to position in the three-dimensional space geological events near wells. Such a seismic prospecting method then comprises the following stages:

Reception by triaxial seismic sensors arranged in a well and coupled with the formations surrounding the well, in order to measure as accurately as possible the vector signal in three components of the direct waves reflected in P, S modes, as well as the converted wave modes;

Orientation in space of the multi-axis seismic reception sensors with the orientation method according to the invention being used;

Well seismic imaging from three oriented components, as described for example in U.S. Pat. No. 6,076,045 which describes isotropic processing of the three oriented components, allowing reading of the polarization of the reflected events which are observed of the imaging and of the position in space of the corresponding reflectors. Thus the dip and the 360° dip azimuth of each of the reflectors is provided.

An important application of the method according to the invention relates to the improvement of the quality control of the three components recorded on the recording site using the available computer resources. In fact, on the one hand, the computer methods allowing orientation of the three-component data in a unique reference frame are easy to implement and, on the other hand, it is easier to visually evaluate the general recording quality and the overall proper operation of the acquisition chain on oriented replays of the three components in relation to non-oriented raw replays, for any depth. Thus, it is possible to use orientation in a unique frame in an automated manner so as to obtain quality control of the seismic measurement in three components, immediately after acquisition of the measurements in the field.

The method allows orientation of the three VSP components in the intervals close to the vertical. In particular, it allows orientation when a single surface seismic source position located in the vicinity of the drill rig has been used, and when the VSP measuring tool lowered in the well is not coupled with a tool for precise measurement of all the angles allowing orientation of the three components of the signals in a geographic frame. This corresponds to the usual VSP configuration in exploration or production wells. The method according to the invention is efficiently applied to a descending shear wave train, including in the presence of birefringence anisotropy in propagation. In fact, the azimuthal direction does not vary in the presence of velocity anisotropy of the two S-wave eigenmodes, whose effect is very weak on adjacent depth levels, insofar as the differential attenuation between the two waves also remains weak. This is generally verified by experience.

The method also allows orientation of the three components of the VSP tools comprising several simultaneous 3C seismic measurement depth levels, for which a single level (or an incomplete number of levels) is coupled with a complete or partial orientation measuring tool.

The ease of implementation of the method with increasingly powerful computers integrated in acquisition systems allows improving the overall on-site quality control of the recorded three-component data, by the production with a slight delay, or even in real time, of the time pick of the descending S-wave and of a replay of the three components oriented in a unique frame. This allows acquisition engineers to rapidly detect on the site and with increased reliability the possible malfunction of the three component acquisition chain.

The advantage of the method is to subsequently allow isotropic processing of the three-component VSP signals, including reprocessing of former VSP data sets for which the downhole tool was not coupled with a complete or partial orientation measuring device.

Another advantage of the method is to allow the operator planning to record a VSP to refine their selection of the type of seismic well tool and of the desirable orientation tool to be combined, prior to carrying out effective on-site acquisition of the VSP in three components, depending on the geological objective which is sought, on the well trajectory deviation being considered and on the desired processing type (1C or 3C) after data acquisition in the field.

The method is applied to several geometrical acquisition configurations for well surveys, but specifically to VSP in vertical to weakly deviated wells, with a source located at a short distance from the wellhead which is a configuration for which there is no known alternative to the method according to the invention.

The method is thus applicable to the very usual cases where no complete and precise orientation measuring tool is coupled with the VSP measuring tool such as for example when the VSP tool comprises three components of orthogonal directional seismic sensors only, in the following configurations:

a) 3C seismic sensors fixedly mounted in the VSP tool;
b) 3C seismic sensors fixedly mounted in a VSP tool also comprising a device for measuring the relative bearing angle in the plane orthogonal to the axis of the VSP tool; and
c) 3C seismic sensors mounted on double cardans with so-called "turret" architecture, that is comprising a free rotation axis parallel to the axis of the tool which therefore is parallel to the axis of the well at the VSP tool anchoring station. Each sensor is mounted jointly with a mass that is offset with respect to the axis of the cardans to obtain a pendular device that is oriented by gravity in a known frame linked with the well trajectory, which is assumed to be known, such as for example from a well trajectory log obtained separately using a gyroscope.

Naturally, the type of device commonly referred to as "relative bearing sensor" and mounting of the seismic sensors on turret type double cardans are inoperative in strictly vertical wells which provide an orientation of the horizontal seismic components that is significant only above a small value of the vertical inclination of the well of the order of 10 degrees, and which becomes increasingly precise when the inclination of the deviated well increases.

The method according to the invention can also be advantageously applied to the descending P-wave train interfered in a vertical well, and whose three-component signal form varies progressively as a function of depth and has a stable total energy azimuthal direction for the interfered signal, and in cases where an old tool comprising three components fixedly mounted in the tool, without an orientation measuring device, is placed in a horizontal drain and the direct P arrival shows no energy on a component axial to the well.

The method according to the invention can also be applied for "walkabove" type VSP configurations, when the source is positioned substantially vertical to a horizontal drain (FIG. 2b) having the sensors fixedly mounted in a well tool comprising no orientation device. After maximizing the direct P arrival, it can be assumed as a first approximation that this arrival merges with the line connecting the source and the receiver, whose relative bearing angle can be deduced from the knowledge of the well trajectory and the relative position of the source with respect to the well.

The method according to the invention can also be advantageously applied for automating P-wave picking and determination of the orientation of the sensors, within the context of seismic prospecting using a conventional walkaway type method. According to this type of method, the well reception device can be fixed or not, and the surface source is successively activated at close positions, either on a fixed azimuth line (2D walkaway) or on a circle concentric to the well or to the average geographic position of the well sensors (walkaround). The previous two configurations can be combined on a more or less complete position grid in the vicinity of the well (3D walkaway or 3D-VSP). In particular, the method according to the invention affords the advantage of providing precise and automatic picking of the direct P-wave when it arrives orthogonally to the component of known vector direction (substantially vertical in this case), without requiring prior orientation of the horizontal components, in the configuration illustrated in FIG. 2c.

A particular application of the method according to the invention is mounting a three-component VSP tool in combination with another logging tool whose orientation is sought, in the extreme case where usual orientation tools such as gyroscopes or magnetometers/inclinometers are no longer operative, for example when the temperature in the well exceeds 220° C.

According to a particular embodiment, for ease of calculation and result reliability reasons, unique reference frames are determined on various well portions by the method according to the invention. These frames have a common axis but they can have different orientations. The well portions have overlapping zones that allow determination of an angle of rotation to be applied to the unique frames of each portion, to obtain a unique frame for the entire well.

Finally, the technique of picking a filtered module signal calculated from the raw components measured by a logging tool of dipole sonic or quadrupole full waveform type can be useful in cases where only the slowness and the attenuation of a shear wave are known, without seeking the azimuthal anisotropy characteristics. In such a case, it is not necessary to measure the orientation of the sonic tool in the well, which simplifies the logging operation.

The invention claimed is:

1. A method of pre-processing seismic data acquired by seismic prospecting using vertical seismic profiling comprising emitting seismic waves and receiving the seismic waves by at least one multi-component sensor positioned in a well at least at two depths with the at least one sensor comprising at least three orthogonal geophones recording as a function of time a first seismic component in a known vector direction, and at least two other seismic components in two directions orthogonal to the known vector direction, comprising:
    a) providing a module signal by calculating a square root of a sum of squares of the at least two other orthogonal seismic components and picking arrival times of a direct seismic wave which is an amplitude extremum of the module signal; and
    b) orienting the two other seismic components in a unique reference frame regardless of a depth of the at least one sensor, by repeating for each depth defining a time window on either side of the arrival times, determining an azimuthal direction by maximizing an energy of the two other seismic components orthogonal to the known vector direction within the time window and orienting to within 360° the two other seismic components orthogonal to the known vector direction in a unique reference frame defined with respect to the azimuthal direction which is identical for each depth.

2. A method as claimed in claim 1, wherein the module signal is obtained by calculating a square root of the sum of the squares of the two other orthogonal seismic components to the known vector direction, and picking arrival times of a descending shear wave.

3. A method as claimed in claim 2, comprising picking an arrival of a pressure wave, calculating velocities of the shear and pressure waves from the arrival times, and obtaining velocity ratios and/or a Poisson coefficient are obtained therefrom.

4. A method as claimed in claim 3 wherein, prior to a), preserving isotropy of the new signal in three components by respecting amplitude ratios and phase differences between the three components.

5. A method as claimed in claim 4, comprising improving a signal-to-noise ratio of the three orthogonal components, prior to providing the module signal, by an isotropic deconvolution of the three orthogonal components using a descending pressure wave signal extracted from the seismic component of known vector direction.

6. A method as claimed in claim 5, comprising filtering the module signal to remove low frequency components prior to picking the arrival times of the direct seismic wave.

7. A method as claimed in claim 4, comprising filtering the module signal to remove low frequency components prior to picking the arrival times of the direct seismic wave.

8. A method as claimed in claim 3, comprising improving a signal-to-noise ratio of the three orthogonal components, prior to providing the module signal, by an isotropic deconvolution of the three orthogonal components using a descending pressure wave signal extracted from the seismic component of known vector direction.

9. A method as claimed in claim 8, comprising filtering the module signal to remove low frequency components prior to picking the arrival times of the direct seismic wave.

10. A method as claimed in claim 3, comprising filtering the module signal to remove low frequency components prior to picking the arrival times of the direct seismic wave.

11. A method as claimed in claim 3, comprising determining a geographic orientation of the unique reference frame.

12. A method as claimed in claim 2, comprising filtering the module signal to remove low frequency components prior to picking the arrival times of the direct seismic wave.

13. A method as claimed in claim 1, comprising determining a geographic orientation of the unique reference frame.

14. A method as claimed in claim 2 wherein, prior to a), preserving isotropy of the new signal in three components by respecting amplitude ratios and phase differences between the three components.

15. A method as claimed in claim 14, comprising improving a signal-to-noise ratio of the three orthogonal components, prior to providing the module signal, by an isotropic deconvolution of the three orthogonal components using a descending pressure wave signal extracted from the seismic component of known vector direction.

16. A method as claimed in claim 15, comprising filtering the module signal to remove low frequency components prior to picking the arrival times of the direct seismic wave.

17. A method as claimed in claim 14, comprising filtering the module signal to remove low frequency components prior to picking the arrival times of the direct seismic wave.

18. A method as claimed in claim 2, comprising improving a signal-to-noise ratio of the three orthogonal components, prior to providing the module signal, by an isotropic deconvolution of the three orthogonal components using a descending pressure wave signal extracted from the seismic component of known vector direction.

19. A method as claimed in claim 18, comprising filtering the module signal to remove low frequency components prior to picking the arrival times of the direct seismic wave.

20. A method as claimed in claim 1, wherein the module signal is obtained by calculating a square root of a sum of squares of the at least three seismic components and picking arrival times of a direct pressure wave.

21. A method as claimed in claim 20 wherein, prior to a), preserving isotropy of the new signal in three components by respecting amplitude ratios and phase differences between the three components.

22. A method as claimed in claim 21, comprising improving a signal-to-noise ratio of the three orthogonal components, prior to providing the module signal, by an isotropic deconvolution of the three orthogonal components using a descending pressure wave signal extracted from the seismic component of known vector direction.

23. A method as claimed in claim 22, comprising filtering the module signal to remove low frequency components prior to picking the arrival times of the direct seismic wave.

24. A method as claimed in claim 21, comprising filtering the module signal to remove low frequency components prior to picking the arrival times of the direct seismic wave.

25. A method as claimed in claim 20, comprising improving a signal-to-noise ratio of the three orthogonal components, prior to providing the module signal, by an isotropic deconvolution of the three orthogonal components using a descending pressure wave signal extracted from the seismic component of known vector direction.

26. A method as claimed in claim 25, comprising filtering the module signal to remove low frequency components prior to picking the arrival times of the direct seismic wave.

27. A method as claimed in claim 20, comprising filtering the module signal to remove low frequency components prior to picking the arrival times of the direct seismic wave.

28. A method as claimed in claim 20, comprising determining a geographic orientation of the unique reference frame.

29. A method as claimed in claim 1 wherein, prior to a), preserving isotropy of the module signal in three components by respecting amplitude ratios and phase differences between the three components.

30. A method as claimed in claim 29, comprising improving a signal-to-noise ratio of the three orthogonal components, prior to providing the module signal, by an isotropic deconvolution of the three orthogonal components using a descending pressure wave signal extracted from the seismic component of known vector direction.

31. A method as claimed in claim 30, comprising filtering the module signal to remove low frequency components prior to picking the arrival times of the direct seismic wave.

32. A method as claimed in claim 29, comprising filtering the module signal to remove low frequency components prior to picking the arrival times of the direct seismic wave.

33. A method as claimed in claim 29, comprising determining a geographic orientation of the unique reference frame.

34. A method as claimed in claim 29, comprising improving a signal-to-noise ratio of the three orthogonal components, prior to providing the module signal, by an isotropic deconvolution of the three orthogonal components using a descending pressure wave signal extracted from the seismic component of known vector direction.

35. A method as claimed in claim 34, comprising filtering the module signal to remove low frequency components prior to picking the arrival times of the direct seismic wave.

36. A method as claimed in claim 34, comprising determining a geographic orientation of the unique reference frame.

37. A method as claimed in claim 1, comprising filtering the module signal to remove low frequency components prior to picking the arrival times of the direct seismic wave.

38. A method as claimed in claim 37, comprising determining a geographic orientation of the unique reference frame.

39. A method as claimed in claim 1, comprising determining a geographic orientation of the unique reference frame.

40. A method as claimed in claim 39, comprising determining the geographic orientation of the reference frame providing the multi-component sensor on a double cardan system to orient by gravity the seismic components when the well inclination reaches a value of at least approximately 10°.

41. A method as claimed in claim 39, comprising lowering a measuring tool comprising the multi-component sensor into the well and determining the geographic orientation of the reference frame by a relative bearing angle measuring system mounted on the measuring tool allowing finding the orientation of the multi-component sensor when the well inclination reaches a value of at least approximately 10°.

42. A method as claimed in claim 39, comprising lowering a measuring tool comprising a plurality of multi-component sensors located at adjacent measurement depths into the well and determining the geographic orientation of the unique reference frame by coupling at least one of the multi-component sensors with a geographic orientation measurement tool.

43. A method as claimed in claim 39, wherein at least a portion of the well is substantially horizontal and the multi-component sensor is fixedly mounted in a measuring tool which is lowered into the well and determining the geographic orientation of the frame equation by likening a direct pressure wave maximization to a straight line connecting a position of the sensor to a position of a source of emitting the seismic waves.

44. A method as claimed in claim 1, wherein unique frames having a common axis are determined for well portions having overlapping zones allowing determination an angle of rotation to be applied to the unique frames to obtain a unique frame for the entire well.

45. A method as claimed in claim 44, wherein orientation in the unique frame is used to control quality of the seismic components immediately after acquisition of measurements from the well.

* * * * *